(12) United States Patent
Nakayama et al.

(10) Patent No.: US 7,014,680 B2
(45) Date of Patent: Mar. 21, 2006

(54) METHOD FOR PREPARING DDR TYPE ZEOLITE MEMBRANE, DDR TYPE ZEOLITE MEMBRANE, AND COMPOSITE DDR TYPE ZEOLITE MEMBRANE, AND METHOD FOR PREPARATION THEREOF

(75) Inventors: Kunio Nakayama, Okazaki (JP); Kenji Suzuki, Nagoya (JP); Manabu Yoshida, Bisai (JP); Kenji Yajima, Nagoya (JP); Toshihiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/140,760

(22) Filed: May 31, 2005

(65) Prior Publication Data

US 2005/0229779 A1    Oct. 20, 2005

Related U.S. Application Data

(63) Continuation of application No. 10/796,890, filed on Mar. 9, 2004, which is a continuation of application No. PCT/JP02/09480, filed on Sep. 17, 2002.

(30) Foreign Application Priority Data

| Sep. 17, 2001 | (JP) | ............................. 2001-280972 |
| Jul. 22, 2002 | (JP) | ............................. 2002-212425 |
| Jul. 29, 2002 | (JP) | ............................. 2002-219135 |
| Aug. 9, 2002 | (JP) | ............................. 2002-232550 |

(51) Int. Cl.
    *B01D 53/22* (2006.01)
    *B01D 71/02* (2006.01)

(52) U.S. Cl. .......................... 95/51; 96/7; 96/10; 96/11; 55/524

(58) Field of Classification Search ................... 95/45, 95/50, 51, 54, 55; 96/4, 7, 10, 11; 55/524, 55/DIG. 5
See application file for complete search history.

(56) References Cited

U.S. PATENT DOCUMENTS

| 5,110,478 A | 5/1992 | Haag et al. |
| 5,429,743 A | 7/1995 | Geus et al. |
| 5,716,527 A | 2/1998 | Deckman et al. |
| 5,772,735 A | 6/1998 | Sehgal et al. |

(Continued)

FOREIGN PATENT DOCUMENTS

EP    0 255 770 A2    2/1988

(Continued)

OTHER PUBLICATIONS

W.M. Meier, et al., "Atlas of Zeolite Structure Types," Elsevier, Fourth Revised Edition 1996, pp. 1-15, 86-87, 222-229.

(Continued)

*Primary Examiner*—Robert H. Spitzer
(74) *Attorney, Agent, or Firm*—Burr & Brown

(57) ABSTRACT

A DDR type zeolite membrane formed on a substrate includes silica as a main component. The DDR type zeolite membrane separates at least one type of a gas component from a mixed gas containing at least two types of gases selected from a group consisting of carbon dioxide ($CO_2$), hydrogen ($H_2$), oxygen ($O_2$), nitrogen ($N_2$), methane ($CH_4$), normal butane (n-$C_4H_{10}$), isobutane (i-$C_4H_{10}$), sulfur hexafluoride ($SF_6$), ethane ($C_2H_6$), ethylene ($C_2H_4$), propane ($C_3H_8$), propylene ($C_3H_6$), carbon monoxide (CO), and nitrogen monoxide (NO). Each single gas permeance at room temperature and 100° C. are different, respectively, in order to separate at least one selected gas component from the mixed gas.

20 Claims, 10 Drawing Sheets

U.S. PATENT DOCUMENTS

| | | | |
|---|---|---|---|
| 5,827,569 | A | 10/1998 | Akiyama et al. |
| 5,871,650 | A | 2/1999 | Lai et al. |
| 5,935,440 | A | 8/1999 | Bratton et al. |
| 5,968,366 | A | 10/1999 | Deckman et al. |
| 6,051,517 | A | 4/2000 | Funke et al. |
| 6,074,457 | A | 6/2000 | Anthonis et al. |
| 6,387,269 | B1 | 5/2002 | Eltner et al. |
| 6,395,067 | B1 | 5/2002 | Kuznicki et al. |
| 6,472,016 | B1 | 10/2002 | Soria et al. |
| 6,488,741 | B1 | 12/2002 | Olson |
| 6,500,233 | B1 | 12/2002 | Miller et al. |
| 6,517,611 | B1 | 2/2003 | Kuznicki et al. |
| 6,527,833 | B1 | 3/2003 | Oyama et al. |
| 6,536,604 | B1 | 3/2003 | Brinker et al. |
| 6,582,495 | B1 | 6/2003 | Chau et al. |
| 6,667,265 | B1 * | 12/2003 | Tomita et al. .................. 502/4 |
| 6,767,384 | B1 | 7/2004 | Vu et al. |
| 2001/0020416 | A1 * | 9/2001 | Yoshikawa et al. ............. 95/45 |
| 2003/0084786 | A1 | 5/2003 | Chau et al. |
| 2004/0134347 | A1 | 7/2004 | Gobina |
| 2004/0167011 | A1 * | 8/2004 | Mori et al. ..................... 502/4 |
| 2004/0173094 | A1 * | 9/2004 | Nakayama et al. ............ 95/45 |

FOREIGN PATENT DOCUMENTS

| | | |
|---|---|---|
| JP | 09-202615 | 8/1997 |
| JP | 2001-247308 A1 | 9/2001 |
| WO | WO 96/29284 | 9/1996 |
| WO | WO 00/23378 | 4/2000 |
| WO | WO 01/64583 A1 | 9/2001 |

OTHER PUBLICATIONS

M.J. den Exter, et al., "Separation of Permanent Gases on the All-Silica 8-Ring Clathrasil DD3R," Studies in Surface Science and Catalysis, vol. 84, Ed. by J. Weitkamp et al., Elsevier (1994), pp. 1159-1166.

Z.A.E.P. Vroon et al., "Preparation and Characterization of Thin Zeolite MFI Membranes on Porous Supports," Journal of Membrane Science 144 (1998), pp. 65-76.

* cited by examiner

METHOD FOR PREPARING DDR TYPE ZEOLITE MEMBRANE, DDR TYPE ZEOLITE MEMBRANE, AND COMPOSITE DDR TYPE ZEOLITE MEMBRANE, AND METHOD FOR PREPARATION THEREOF

CROSS REFERENCE TO RELATED APPLICATIONS

This application is a continuation of U.S. application Ser. No. 10/796,890 filed Mar. 9, 2004, now allowed, which is a continuation of International Application No. PCT/JP02/09480 having an international filing date of Sep. 17, 2002, which designated the United States, the entireties of which are incorporated herein by reference.

This application claims the benefit of Japanese Application No. 2001-280972 filed Sep. 17, 2001, Japanese Application No. 2002-212425 filed Jul. 22, 2002, Japanese Application No. 2002-219135 filed Jul. 29, 2002, and Japanese Application No. 2002-232550 filed Aug. 9, 2002, the entireties of which are incorporated herein by reference.

FIELD OF THE INVENTION

The present invention (a first aspect of the present invention) relates to a production method for a DDR type zeolite membrane. More particularly, the present invention relates to a method for easily producing a DDR type zeolite membrane having an industrially acceptable thickness in a short period of time.

The present invention (a second aspect of the present invention) relates to a DDR type zeolite membrane, a gas separation method, and a gas separation apparatus. More particularly, the present invention relates to a DDR type zeolite membrane that can separate one or more types of particular gas components from a mixed gas containing two or more particular gas components.

The present invention (a third aspect of the present invention) relates to a DDR type zeolite membrane composite and a production method of the same. More particularly, the present invention relates to a DDR type zeolite membrane composite that has high mechanical strength, can prevent occurrence of defects such as cracks due to thermal stress and so on, and can secure a sufficient flux, when a DDR type zeolite membrane composite is used, for example, as a gas separation membrane, and a production method of the same.

BACKGROUND OF THE INVENTION

Zeolite is used as a catalyst, a catalyst carrier, an absorbent, or the like, and a zeolite laminated film formed on a porous substrate made of metal or ceramic is used for a gas separation membrane or a pervaporation membrane by making use of a molecular sieving effect of the zeolite. In view of these circumstances, zeolite membranes using various porous substrates and production methods of the same have been proposed. Such a zeolite formed into a thin membrane is used as a molecular separation membrane of a gas separation membrane, a pervaporation membrane, or the like by its molecular sieving effect.

There are many types of zeolites such as LTA, MFI, MOR, AFI, FER, FAU, DDR depending on crystal structures. Among them, DDR (Deca-Dodecasil 3R) is a crystal mainly containing silica, and its pore is formed by a polyhedron with an oxygen eight-membered ring, and a known diameter of the pore of the oxygen eight-membered ring is 4.4×3.6 angstroms (see W. M. Meier, D. H. Olson, Ch. Baerlocher, Atlas of Zeolite Structure Types, Elsevier (1996)).

A DDR type zeolite having such a structural feature is a zeolite having a relatively smaller pore diameter, and can be applied to a molecular sieve membrane for separating a gas of low molecular weight such as carbon dioxide ($CO_2$), methane ($CH_4$), ethane ($C_2H_6$) that are hard to separate by other zeolites such as MFI, MOR, AFI, FER, and FAU types.

There have been proposed only a few production methods for such DDR type zeolites. Some proposals have been made on powder synthesis, but no proposals have been made on the synthesis of the membrane. As one of the few proposals related to powder, for example, M. J. den Exter, J. C. Jansen, H. van Bekkum, Studies in Surface Science and Catalysis, Vol. 84, Ed. by J. Weitkamp et. al., Elsevier (1994), 1159–1166 discloses a method for producing a DDR type zeolite powder by hydrothermal synthesis using tetramethoxysilane, 1-adamantanamine, ethylenediamine, or the like, as raw materials.

However, the method for producing a DDR type zeolite powder requires hydrothermal synthesis using an autoclave at 160° C. for a long period of 25 days, and requires constant stirring of a raw material solution, thus is not a convenient method.

Further, this production method provides only a DDR type zeolite powder with a crystal size of 5 to 25 µm, and thus has a problem that it cannot produce a dense separation membrane having a sufficient thickness for a gas separation process in a petrochemical industry or the like.

The present invention (a first aspect of the present invention) is made in view of the problems of the related art, and has an object to provide a method for easily producing a DDR type zeolite membrane having a thickness that is acceptable in an industrial gas separation process or the like and in a short period of time.

No conventional zeolite membrane has a pore diameter that can separate independently a molecule of a relatively low molecular weight such as methane ($CH_4$), ethane ($C_2H_6$), propane ($C_3H_8$), carbon dioxide ($CO_2$), or the like contained in a natural gas.

Known as a refining method of a natural gas is a method using a separation membrane mainly containing an organic substance that selectively passes carbon dioxide ($CO_2$) rather than methane ($CH_4$). However, an organic membrane has low mechanical strength and low heat resistance, is plasticized by carbon dioxide, and is deteriorated by liquid hydrocarbon. Thus, there is no membrane suitable for membrane separation of a gas containing a molecule of a low molecular weight such as a natural gas.

The present invention (a second aspect of the present invention) is made in view of the above described problems, and has an object to provide a DDR type zeolite membrane having high mechanical strength and high heat resistance, capable of causing hardly such problems as plasticization by carbon dioxide and deterioration by liquid hydrocarbon, and separating one or more types of particular gas components from a mixed gas containing two or more types of particular gas components such as a natural gas; a gas separation method using a DDR type zeolite membrane; and a gas separation apparatus being comprised of a DDR type zeolite membrane.

Generally, a zeolite membrane formed into a thin membrane has low mechanical strength, and thus a zeolite membrane is formed on a porous substrate made of metal or ceramic to form a zeolite membrane composite to increase the mechanical strength. Besides the increase in the mechanical strength, such a zeolite membrane can form a thin zeolite membrane, and thus can increase a gas flux when the membrane is used as a gas separation membrane, compared to when used as a self-supported membrane of a zeolite alone.

For the zeolite membrane formed on the porous substrate, thermal expansion behaviors significantly differ between the porous substrate and the zeolite membrane, which may cause defects such as cracks in the zeolite membrane on the porous substrate when a structure-directing agent used in zeolite synthesis is removed by calcination.

Thus, Vroon et al. of University of Twente propose that the defects such as cracks can be effectively prevented by making the thickness of the zeolite membrane to be formed on an alumina substrate thinner (See Journal of Membrane Science, 144 (1998), pages 65–76). However, the probability in the occurrence of defects such as cracks due to thermal stress cannot be reduced sufficiently by simply making the zeolite membrane thinner.

There is disclosed in JP-A-9-202615 a zeolite membrane having a zeolite crystal on a porous substrate and a production method of the same. It describes that the occurrence of defects such as cracks due to thermal stress in the thermal treatment process of the zeolite membrane and the like can be reduced by employing such a constitution that a porous substrate possesses zeolite crystal in the inside thereof.

However, there is a problem that the zeolite membranes disclosed in JP-A-9-202615 and the like cannot always be applicable to all types of zeolites. For example, for an LTA type zeolite, defects such as cracks of a zeolite membrane formed on a porous substrate cannot be decreased. The above described advantage varies, depending upon materials of the porous substrate, and for example, when alumina is used for a porous substrate, and an MFI type zeolite is used for a zeolite membrane, the defects such as cracks or the like occur after the zeolite membrane is used a few times.

Incidentally, in the case of the zeolite membrane disclosed in JP-A-9-202615, a porous substrate of 0.5 mm or more in thickness is used since an amount of raw material solution being present in the porous substrate is important. If a zeolite membrane composite thus configured is too thick when used as a gas separation membrane, there is such a problem that pressure loss becomes large, thereby a sufficient gas flux can not be attained.

The present invention (a third aspect of the present invention) is made in view of the above problems, and has an object to provide a DDR type zeolite membrane composite that has high mechanical strength, can prevent occurrence of defects such as cracks due to thermal stress, and can secure a sufficient flux, when a DDR type zeolite membrane composite is used as a gas separation membrane, and a production method of the same.

SUMMARY OF THE INVENTION

According to the present invention (a first aspect of the present invention), there is provided a production method of a DDR type zeolite membrane, characterized in that a DDR type zeolite membrane is formed by carrying out hydrothermal synthesis with using a raw material solution having a containing ratio of 1-adamantanamine to silica (1-adamantanamine/$SiO_2$) in a molar ratio of 0.03 to 0.4, a containing ratio of water to the silica (water/$SiO_2$) in a molar ratio of 20 to 500, and a containing ratio of ethylenediamine to the 1-adamantanamine (ethylenediamine/1-adamantanamine) in a molar ratio of 5 to 32; and a DDR type zeolite powder to be a seed crystal, and forming a DDR type zeolite membrane therefrom.

In the present invention (the first aspect of the present invention), it is preferable that a raw material solution has a containing ratio of 1-adamantanamine to silica (1-adamantanamine/$SiO_2$) of 0.05 to 0.25 in a molar ratio, a containing ratio of water to silica (water/$SiO_2$) of 28 to 220 in a molar ratio, and a containing ratio of ethylenediamine to 1-adamantanamine (ethylenediamine/1-adamantanamine) of 8 to 24 in a molar ratio.

In the present invention (the first aspect of the present invention), it is preferable to prepare a raw material solution by dissolving 1-adamantanamine in ethylenediamine to prepare a 1-adamantanamine solution, and then mixing the 1-adamantanamine solution and said silica sol solution containing silica.

In the present invention (the first aspect of the present invention), it is preferable that hydrothermal synthesis is performed at 130° C. to 200° C.

In the present invention (the first aspect of the present invention), it is preferable that a DDR type zeolite powder is dispersed in a raw material solution, and a DDR type zeolite membrane is formed on a porous substrate.

In the present invention (the first aspect of the present invention), it is preferable that a DDR type zeolite powder is deposited on a porous substrate, and a raw material solution is brought into contact with the porous substrate to form a DDR type zeolite membrane on the porous substrate.

In the present invention (the first aspect of the present invention), it is preferable that a DDR type zeolite membrane formed on the porous substrate has a thickness of 0.1 to 50 $\mu m$, and the porous substrate is in the form of a plate, a cylinder, a honeycomb, or a monolith being formed from a plurality of cylindrical tubes integrated.

As described above, according to the production method of a DDR type zeolite membrane of the present invention (the first aspect of the present invention), a DDR type zeolite membrane having a thickness of being preferably employable in an industrial gas separation process may be easily produced in a short period of time since it is hydrothermally synthesized by using a raw material solution containing raw materials such as 1-adamantanamine as a structure-directing agent in a predetermined composition ratio, and a DDR type zeolite powder to be a seed crystal. A DDR type zeolite membrane obtained by the production method according to the present invention (the first aspect of the present invention) may be suitably usable as a separation membrane to be used for separating various substances or a membrane reactor, for example, in combination with a catalyst or the like, in a petrochemical industry.

According to the present invention (a second aspect of the present invention), there is provided a DDR type zeolite membrane, characterized in that it is formed as a membrane on a substrate and its main component is silica, and that its single gas permeances at room temperature and 100° C. are different among at least two types of gases selected from a group consisting of gases capable of forming a mixed gas at room temperature and 100° C. There is provided a DDR type zeolite membrane, characterized in that its single gas permeances at room temperature and 100° C. as to at least two types of gases selected from a group consisting of carbon dioxide ($CO_2$), hydrogen ($H_2$), oxygen ($O_2$), nitrogen ($N_2$), methane ($CH_4$), normal butane (n-$C_4H_{10}$), isobutane (i-$C_4H_{10}$), sulfur hexafluoride ($SF_6$), ethane ($C_2H_6$), ethylene ($C_2H_4$), propane ($C_3H_8$), propylene ($C_3H_6$), carbon monoxide (CO), and nitrogen monoxide (NO) are different among said at least two gases, respectively.

In the present invention (the second aspect of the present invention), it is preferable that a gas permeance of carbon dioxide ($CO_2$) at room temperature is $1.0 \times 10^{-9}$ ($mol \cdot m^{-2} \cdot s^{-1} \cdot Pa^{-1}$) or more.

In the present invention (the second aspect of the present invention), it is preferable that a gas permeance of carbon dioxide ($CO_2$) at 100° C. is $5.0 \times 10^{-10}$ ($mol \cdot m^{-2} \cdot s^{-1} \cdot Pa^{-1}$) or more.

In the present invention (the second aspect of the present invention), it is preferable that each separation factor of $CO_2/CH_4$ in a mixed gas containing carbon dioxide ($CO_2$) and methane ($CH_4$) in an equimolar amount (a value of respective ratios of gas fluxes of $CO_2$ at room temperature and 100° C. to gas fluxes of $CH_4$ at room temperature and 100° C. when the mixed gas permeates the DDR type zeolite membrane) is 2 or more at room temperature and 100° C., respectively.

In the present invention (the second aspect of the present invention), it is preferable that each value of a ratio of a single gas permeance of carbon dioxide ($CO_2$) at room temperature and 100° C. to a single gas permeance of any one of hydrogen ($H_2$), oxygen ($O_2$), nitrogen ($N_2$), methane ($CH_4$), normal butane ($n$-$C_4H_{10}$), isobutane ($i$-$C_4H_{10}$), and sulfur hexafluoride ($SF_6$) at room temperature and 100° C. is 2 or more, respectively.

In the present invention (the second aspect of the present invention), it is preferable that each value of a ratio of a single gas permeance of hydrogen ($H_2$) at room temperature and 100° C. to a single gas permeance of any one of oxygen ($O_2$), nitrogen ($N_2$), methane ($CH_4$), normal butane ($n$-$C_4H_{10}$), isobutane ($i$-$C_4H_{10}$), and sulfur hexafluoride ($SF_6$) at room temperature and 100° C. is 2 or more, respectively.

In the present invention (the second aspect of the present invention), it is preferable that each value of a ratio of a single gas permeance of oxygen ($O_2$) at room temperature and 100° C. to a single gas permeance of any one of nitrogen ($N_2$), methane ($CH_4$), normal butane ($n$-$C_4H_{10}$), isobutane ($i$-$C_4H_{10}$), and sulfur hexafluoride ($SF_6$) at room temperature and 100° C. is 1.1 or more, respectively.

In the present invention (the second aspect of the present invention), it is preferable that each value of a ratio of a single gas permeance of nitrogen ($N_2$) at room temperature and 100° C. to a single gas permeance of any one of methane ($CH_4$), normal butane ($n$-$C_4H_{10}$), isobutane ($i$-$C_4H_{10}$), and sulfur hexafluoride ($SF_6$) at room temperature and 100° C. is 2 or more, respectively.

In the present invention (the second aspect of the present invention), it is preferable that each value of a ratio of a single gas permeance of methane ($CH_4$) at room temperature and 100° C. to a single gas permeance of any one of normal butane ($n$-$C_4H_{10}$), isobutane ($i$-$C_4H_{10}$), and sulfur hexafluoride ($SF_6$) at room temperature and 100° C. is 2 or more, respectively.

In the present invention (the second aspect of the present invention), it is preferable that each value of a ratio of a single gas permeance of normal butane ($n$-$C_4H_{10}$) at room temperature and 100° C. to a single gas permeance of isobutane ($i$-$C_4H_{10}$) or sulfur hexafluoride ($SF_6$) at room temperature and 100° C. is 1.1 or more, respectively.

In the present invention (the second aspect of the present invention), it is preferable that each value of a ratio of a single gas permeance of isobutane ($i$-$C_4H_{10}$) at room temperature and 100° C. to a single gas permeance of sulfur hexafluoride ($SF_6$) at room temperature and 100° C. is 1.1 or more, respectively.

In the present invention (the second aspect of the present invention), it is preferable that a separation factor each of $H_2/CH_4$ in a mixed gas containing hydrogen ($H_2$) and methane ($CH_4$) in an equimolar amount at room temperature and 100° C. (each value of a ratio of a gas flux of $H_2$ at room temperature and 100° C. to a gas flux of $CH_4$ at room temperature and 100° C. when the mixed gas permeates a DDR type zeolite membrane) is 2 or more, respectively.

In the present invention (the second aspect of the present invention), it is preferable that a separation factor each of $C_2H_4/C_2H_6$ in a mixed gas containing ethylene ($C_2H_4$) and ethane ($C_2H_6$) in an equimolar amount at room temperature and 100° C. is 1.5 or more.

In the present invention (the second aspect of the present invention), it is preferable that a separation factor each of $O_2/N_2$ in the air at room temperature and 100° C. is 1.5 or more.

In the present invention (the second aspect of the present invention), there is provided a gas separation method for separating at least one type of gas component from a mixed gas containing at least two types of gas components selected from a group consisting of carbon dioxide ($CO_2$), hydrogen ($H_2$), oxygen ($O_2$), nitrogen ($N_2$), water ($H_2O$), methane ($CH_4$), normal butane ($n$-$C_4H_{10}$), isobutane ($i$-$C_4H_{10}$), sulfur hexafluoride ($SF_6$), ethane ($C_2H_6$), ethylene ($C_2H_4$), propane ($C_3H_8$), propylene ($C_3H_6$), carbon monoxide (CO), and nitrogen monoxide (NO), using the above described DDR type zeolite membrane.

In the present invention (the second aspect of the present invention), it is preferable that carbon dioxide ($CO_2$) is selectively separated from a mixed gas containing carbon dioxide and methane ($CH_4$).

In the present invention (the second aspect of the present invention), there is provided a gas separation apparatus being comprised of the above described DDR type zeolite membrane in order to separate at least one type of gas component from a mixed gas containing at least two types of gas components selected from a group consisting of carbon dioxide ($CO_2$), hydrogen ($H_2$), oxygen ($O_2$), nitrogen ($N_2$), water ($H_2O$), methane ($CH_4$), normal butane ($n$-$C_4H_{10}$), isobutane ($i$-$C_4H_{10}$), sulfur hexafluoride ($SF_6$), ethane ($C_2H_6$), ethylene ($C_2H_4$), propane ($C_3H_8$), propylene ($C_3H_6$), carbon monoxide (CO), and nitrogen monoxide (NO).

In the case of the present invention (the second aspect of the present invention), a gas separation apparatus being comprised of the above-described DDR type zeolite membrane capable of selectively separating carbon dioxide ($CO_2$) from a mixed gas containing carbon dioxide and methane ($CH_4$) is preferable.

As described above, a DDR type zeolite membrane of the present invention (the second aspect of the present invention) may separate at least one type of particular gas components from a mixed gas containing at least two types of particular gas components such as a natural gas since its respective single gas permeances of at least two kinds of gases selected from the group consisting of a plurality of the particular gases are different from each other. Since it is formed on the substrate, it has a high mechanical strength. And, since it is a DDR type zeolite membrane (an inorganic substance), it shows a high heat resistance, and can prevent plasticization caused by carbon dioxide, and deterioration by liquid hydrocarbon.

According to the gas separation method of the present invention (the second aspect of the present invention), since the gas separation is carried out by using a DDR type zeolite membrane of the present invention (the second aspect of the present invention), at least one type of particular gas components can be separated from at least two types of gases selected from the group consisting of a plurality of particular gases. Especially, carbon dioxide ($CO_2$) may be selectively separated from the mixed gas containing carbon dioxide and methane ($CH_4$). According to the gas separation apparatus of the present invention (the second aspect of the present invention), since it is comprised of a DDR type zeolite membrane of the present invention (the second aspect of the present invention) and a gas is separated by means of this membrane, at least one type of particular gas components can be separated from at least two types of gases selected from the group consisting of a plurality of particular gases.

According to the present invention (a third aspect of the present invention), there is provided a DDR type zeolite membrane composite, characterized in that there is provided with a porous substrate, and a DDR type zeolite layer deposited within pores of the porous substrate and having a thickness 5 to 50 times of a mean pore diameter of the porous substrate; said DDR type zeolite layer composed of a DDR type zeolite having been disposed within pores of at least one surface of the porous substrate.

In a DDR type zeolite membrane composite according to the present invention (the third aspect of the present invention), it is preferable that the DDR type zeolite membrane composite further comprises a DDR type zeolite layer deposited outside of the substrate, which is made of a DDR type zeolite and has a thickness of 30 $\mu$m or less, on a surface of the porous substrate on which the DDR type zeolite layer deposited within pores of substrate is disposed.

In a DDR type zeolite membrane composite according to the present invention (the third aspect of the present invention), it is preferable that the mean pore diameter of the porous substrate is 0.05 to 10 $\mu$m.

According to the present invention (the third aspect of the present invention), there is provided a production method of a DDR type zeolite membrane composite, characterized by forming a raw material solution having a mixing ratio of 1-adamantanamine to silica (1-adamantanamine (mol)/silica (mol)) of 0.03 to 0.4, and a mixing ratio of water to silica (water (mol)/silica (mol)) of 20 to 500, and immersing a porous substrate in thus obtained raw material solution for hydrothermal synthesis, thereby forming a DDR type zeolite layer deposited within pores of substrate having a thickness 5 to 50 times of a mean pore diameter of the porous substrate, and being composed of a DDR type zeolite, which is disposed within pores of at least one surface of the porous substrate.

In the production method of a DDR type zeolite membrane composite according to the present invention (the third aspect of the present invention), it is preferable that a DDR type zeolite layer deposited outside of the substrate, which is made of a DDR type zeolite and has a thickness of 30 $\mu$m or less, is formed on a surface of the porous substrate on which the DDR type zeolite layer deposited within pores of substrate is disposed.

In the production method of a DDR type zeolite membrane composite according to the present invention (the third aspect of the present invention), it is preferable to use a porous substrate that has a mean pore diameter of 0.05 to 10 $\mu$m as the porous substrate.

In the production method of a DDR type zeolite membrane composite according to the present invention (the third aspect of the present invention), it is preferable to perform the hydrothermal synthesis at 130° C. to 200° C. in order to obtain the DDR type zeolite membrane composite.

In the production method of a DDR type zeolite membrane composite according to the present invention (the third aspect of the present invention), one may use, as the raw material solution, the one containing further a DDR type zeolite powder to be a seed crystal, or one may immerse a resultant prepared by depositing a DDR type zeolite powder to be a seed crystal on the surface of the porous substrate in the raw material solution.

According to the present invention (the third aspect of the present invention), there is provided a DDR type zeolite membrane composite not only having high mechanical strength, but also being capable of securing a sufficient flux when used, for example, as a gas separation membrane. The production method of a DDR type zeolite membrane composite according to the present invention (the third aspect of the present invention) allows a DDR type zeolite membrane composite to be easily produced at low cost.

DETAILED DESCRIPTION OF THE INVENTION

Figure 1:
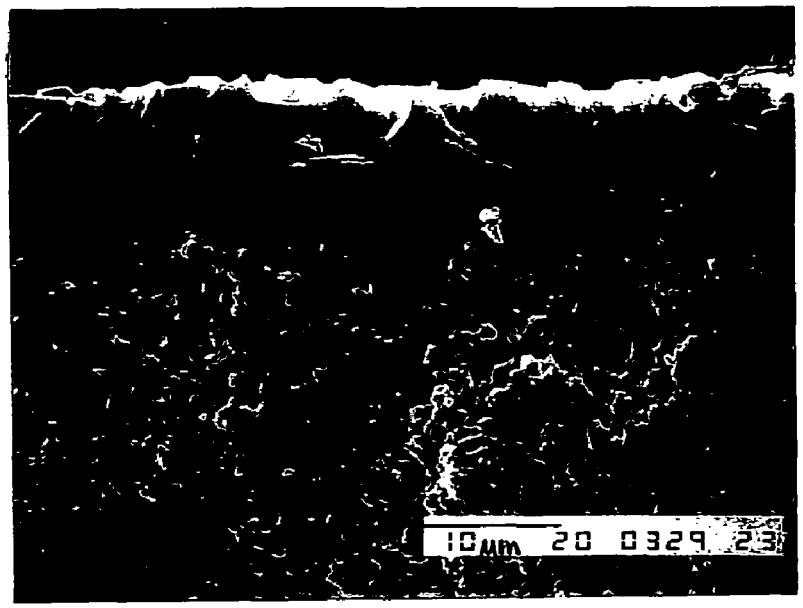
FIG. 1 shows an electron microphotograph of a cross section of a DDR type zeolite membrane produced in Example 13 of the present invention (a first aspect of the present invention).

Now, embodiments of the present invention will be described. The present invention is not limited to the embodiments described below, and it is to be understood that appropriate modifications or improvements in design may be made based on ordinary knowledge of those skilled in the art without departing from the scope of the present invention.

The present invention (a first aspect of the present invention) is a production method of a DDR type zeolite membrane, and it provides a production method of a DDR type zeolite membrane, characterized in that a raw material solution having a containing ratio of 1-adamantanamine to silica (1-adamantanamine/$SiO_2$) in a molar ratio of 0.03 to 0.4, a containing ratio of water to silica (water/$SiO_2$) in a molar ratio of 20 to 500, and a containing ratio of ethylenediamine to 1-adamantanamine (ethylenediamine/1-adamantanamine) in a molar ratio of 5 to 32, and a DDR type zeolite powder to be a seed crystal are used for hydrothermal synthesis to form a DDR type zeolite membrane. Details thereof will be now described. Hereinafter, a containing ratio (a molar ratio) of 1-adamantanamine to silica is referred to as a "1-adamantanamine/$SiO_2$ ratio", a containing ratio (a molar ratio) of water to silica is referred to as a "water/$SiO_2$ ratio", and a containing ratio (a molar ratio) of ethylenediamine to 1-adamantanamine is referred to as an "ethylenediamine/1-adamantanamine ratio".

In the present invention (the first aspect of the present invention), 1-adamantanamine is used as a structure-directing agent for forming a DDR type zeolite membrane. First, 1-adamantanamine and silica sol, water, ethylenediamine, and other additives, if required, are used to prepare a raw material solution. Using, for example, a trace amount of sodium aluminate as an additive allows Al to replace part of Si that constitutes a DDR type zeolite membrane. Such replacement can add catalysis or the like to a DDR type zeolite membrane to be formed, besides a separation function. In preparation of a raw material solution, a 1-adamantanamine/$SiO_2$ ratio, a water/$SiO_2$ ratio, and an ethylenediamine/1-adamantanamine ratio are precisely adjusted in the present invention.

When the 1-adamantanamine/$SiO_2$ ratio is below 0.03, 1-adamantanamine as the structure-directing agent is insufficient to form a DDR type zeolite membrane, which is not preferable. When the 1-adamantanamine/$SiO_2$ ratio exceeds 0.4, a DDR type zeolite membrane can be formed, but 1-adamantanamine is too much to act as the structure-directing agent, and the addition of expensive 1-adamantanamine in such a larger amount is not preferable in view of production costs.

In terms of forming a DDR type zeolite membrane considering the production costs, the 1-adamantanamine/$SiO_2$ ratio is preferably 0.05 to 0.25, and more preferably 0.05 to 0.12.

When the water/$SiO_2$ ratio is below 20, an $SiO_2$ concentration of a raw material solution is too high to form a dense DDR type zeolite membrane, which is not preferable, and when the water/$SiO_2$ ratio exceeds 500, the $SiO_2$ concentration of a raw material solution is too low to form a DDR type zeolite membrane, which is not preferable. In terms of forming the dense DDR type zeolite membrane, the water/$SiO_2$ ratio is preferably 28 to 220, and more preferably 28 to 120.

1-Adamantanamine is a solid compound at normal temperature, and it is sometimes hard to dissolve completely to be a uniform solution in preparation of a raw material solution. When a raw material solution with 1-adamantanamine remaining as powder is used, a DDR type zeolite membrane having a uniform crystal size and thickness is sometimes hard to produce. Thus, if one prepares a raw material solution by adding ethylenediamine thereto, one may dissolve 1-adamantanamine easily thereinto, thereby one may produce a dense DDR type zeolite membrane having a uniform crystal size and thickness.

The ethylenediamine/1-adamantanamine ratio below 5 is insufficient to easily dissolve 1-adamantanamine, and the ethylenediamine/1-adamantanamine ratio exceeding 32 is not preferable because ethylenediamine that does not contribute to reaction becomes excessive to increase production costs. In terms of easily dissolving 1-adamantanamine, and producing a DDR type zeolite membrane having a uniform crystal size and thickness, the ethylenediamine/1-adamantanamine ratio is preferably 8 to 24, and more preferably 10 to 16.

In the present invention (the first aspect of the present invention), 1-adamantanamine is previously dissolved in ethylenediamine to prepare a 1-adamantanamine solution. It is preferable to use a raw material solution prepared by mixing 1-adamantanamine solution thus prepared with a silica sol solution containing silica; this is because 1-adamantanamine can be more easily and completely dissolved, and a dense DDR type zeolite membrane having a uniform crystal size and thickness can be produced. The silica sol solution can be prepared by dissolving fine powdery silica in water or hydrolyzing an alkoxide, but a commercially available silica sol may be used by adjusting a silica concentration thereof.

In the present invention (the first aspect of the present invention), a DDR type zeolite powder is used in producing a DDR type zeolite membrane, and it is preferable to disperse a DDR type zeolite powder in a prepared raw material solution. A DDR type zeolite powder may become a seed crystal, and is effective to facilitate crystal growth. This accelerates the formation of a DDR type zeolite membrane, and easily provides a dense membrane thereof. A general stirring method may be used as a method for dispersing a DDR type zeolite powder in a raw material solution, but other methods such as ultrasonic treatment may be used, and uniform dispersion allows a denser DDR type zeolite membrane with a uniform thickness to be formed.

A raw material solution in which a DDR type zeolite powder to be the seed crystal is dispersed is placed in a vessel, for example, a pressure-resistant vessel, together with a support material for forming a membrane thereon, and subjected to hydrothermal synthesis, thus allowing a DDR type zeolite membrane to be produced.

In the present invention (the first aspect of the present invention), a temperature in the hydrothermal synthesis is preferably 130° C. to 200° C., more preferably 140° C. to 180° C., and most preferably 150° C. to 160° C. The hydrothermal synthesis performed at a temperature below 130° C. is not preferable because a DDR type zeolite membrane is hard to form, and the hydrothermal synthesis performed at a temperature beyond 200° C. is not preferable because a DOH phase that is a different phase is formed.

A treatment period for the hydrothermal synthesis may be 1 to 10 days. Thus, according to the present invention (the first aspect of the present invention), a DDR type zeolite membrane having a sufficient thickness (40 to 125 $\mu$m) as a self-supported membrane can be produced in an extremely short period of time, compared to a conventional production method of a DDR type zeolite.

In the present invention (the first aspect of the present invention), a porous substrate is used as a support material on which a DDR type zeolite membrane is formed in the hydrothermal synthesis, thus a DDR type zeolite membrane can be formed on the porous substrate. The porous substrate has three-dimensionally communicated many pores, and possesses gas permeance. A pore diameter of the porous substrate on a forming side of a DDR type zeolite membrane is preferably 0.003 to 10 µm. This is because a pore diameter of equal to or less than 0.003 µm causes too high resistance when a gas permeates, and a pore diameter of mere than 10 µm tends to cause defects in a DDR type zeolite membrane. In the present invention (the first aspect of the present invention), a porous substrate made of ceramic such as alumina, zirconia, or mullite, or glass, zeolite, clay, metal, carbon, or the like as a raw material can be satisfactorily used. A porous substrate of alumina is preferable in view of a pore diameter and strength. The porous substrate is preferably in the form of a plate, a cylinder, a honeycomb, or a monolith having a plurality of cylindrical tubes integrated. The "monolith" in the present invention (the first aspect of the present invention) refers to a plurality of cylindrical tubes integrated and having a plurality of axial communication holes.

If a DDR type zeolite membrane is formed on the porous substrate, its mechanical strength is increased; thus formed membrane may have a smaller thickness than the self-supported membrane does. At this time, a DDR type zeolite membrane may be 0.1 to 50 µm in the thickness, and is preferably 1 to 25 µm in the thickness.

In the present invention (the first aspect of the present invention), it is also preferable, in order to form a dense DDR type zeolite membrane having a uniform thickness, that a DDR type zeolite powder is previously deposited on a porous substrate, instead of dispersing a DDR type zeolite powder to be a seed crystal in a raw material solution, and a porous substrate on which a DDR type zeolite powder is deposited is brought into contact with a raw material solution to form a DDR type zeolite membrane on the porous substrate.

"Depositing a DDR type zeolite powder on the porous substrate" refers to a state where a DDR type zeolite powder to be a seed crystal is placed on a surface of the porous substrate on which a DDR type zeolite membrane is to be formed, but a firm adhesion is not necessarily required. "Bringing a porous substrate into contact with a raw material solution" refers to bringing a surface of the porous substrate on which a DDR type zeolite powder to be a seed crystal is placed into contact with the raw material solution. Thus, a DDR type zeolite powder is substantially brought into contact with the raw material solution. In order to deposit a DDR type zeolite powder on a porous substrate, for example, a DDR type zeolite powder may be dispersed in water to prepare a dispersion solution with an appropriate concentration, and an appropriate amount of dispersion solution may be applied to the surface of the porous substrate on which a DDR type zeolite membrane is to be formed. As an application method, dropping, dipping, spin coating, printing, or the like can be selected, depending on purposes.

A second aspect of the present invention will now be described in detail with reference to the drawings.

A DDR type zeolite membrane according to the embodiment is obtained by forming a DDR type (Deca-Dodecasil 3R) zeolite on a substrate in the form of a membrane (membrane forming). A DDR type zeolite is a crystal mainly containing silica, and its many pores are formed by a polyhedron with an eight-membered ring of an oxygen atom, and a pore diameter of a part formed by the eight-membered ring of the oxygen atom is 4.4×3.6 angstroms (see W. M. Meier, D. H. Olson, Ch. Baerlocher, Atlas of Zeolite Structure Types, Elsevier (1996)).

The method for forming a DDR type zeolite on the substrate in the form of the membrane is not limited, but the method described below is preferable.

1-adamantanamine, silica, and water are mixed in a predetermined mixing ratio to prepare a raw material solution. Then, a solution in which a DDR type zeolite powder is dispersed is coated to a substrate. Hydrothermal synthesis is performed with immersing the substrate on which a DDR type zeolite powder has been deposited in a raw material solution to obtain a DDR type zeolite membrane. Ethylenediamine may be mixed into a raw material solution. When a DDR type zeolite membrane is formed on the substrate as described above, a membrane formed on the substrate has high mechanical strength, allowing use under high pressure.

A material of a substrate used in the embodiment is not limited, but a ceramic porous substrate such as an alumina porous substrate is preferable. The porous substrate facilitates gas permeation to increase gas treatment efficiency. Further, the ceramic porous substrate increases mechanical strength of a DDR type zeolite membrane formed on the substrate. Using a substrate having a property of passing a particular gas such as a palladium metal substrate that passes hydrogen, or a perovskite type ceramic substrate that passes oxygen is also preferable in separating the particular gas.

"Porous" means, for example, having many three-dimensionally communicated micropores, and a pore diameter is preferably 0.003 to 10 µm, and more preferably 0.005 to 5 µm. A diameter below 0.003 µm causes high resistance when a gas permeates, and a diameter exceeding 10 µm tends to cause a pin-hole in a DDR type zeolite membrane, which are not preferable.

A DDR type zeolite membrane has different single gas permeances at room temperature and 100° C. respectively as to at least two types of gases selected from a group consisting of gases capable of forming a mixed gas at room temperature and 100° C. Furthermore, each single gas permeance at room temperature and 100° C. as to at least two types of gases selected from a group consisting of carbon dioxide ($CO_2$), hydrogen ($H_2$), oxygen ($O_2$), nitrogen ($N_2$), water ($H_2O$), methane ($CH_4$), normal butane (n-$C_4H_{10}$), isobutane (i-$C_4H_{10}$), sulfur hexafluoride ($SF_6$), ethane ($C_2H_6$), ethylene ($C_2H_4$), propane ($C_3H_8$), propylene ($C_3H_6$), carbon monoxide (CO), and nitrogen monoxide (NO) are different, respectively among said at least two types of gases.

The gas permeance refers to the amount of moles (mol) of a gas that permeates the membrane per unit area ($m^2$), unit pressure (Pa), and unit time (s) at a predetermined temperature. Especially, a gas permeance obtained by a gas permeation test using one component of gas as a test gas is referred to as a single gas permeance.

Since it has the different gas permeances as to the above-mentioned particular gases (carbon dioxide, hydrogen, oxygen, nitrogen, water vapor, methane, normal butane, isobutane, sulfur hexafluoride, ethane, ethylene, propane, propylene, carbon monoxide, and nitrogen monoxide), as is discussed above, one or more types of particular gas components may be separated from a mixed gas containing two or more particular gas components such as a natural gas. This DDR type zeolite membrane has high heat resistance, and the plasticization caused by carbon dioxide and the deterioration by liquid hydrocarbon hardly occur, which is not the case when membrane is composed of an organic substance.

A DDR type zeolite membrane according to this embodiment has especially high gas permeance of carbon dioxide among the particular gases. It is preferable that the gas permeance at room temperature is $1.0 \times 10^{-9}$ (mol·m$^{-2}$·s$^{-1}$·Pa$^{-1}$) or more, and the gas permeance at 100° C. is $5.0 \times 10^{-10}$ (mol·m$^{-2}$·s$^{-1}$·Pa$^{-1}$) or more. The separation of carbon dioxide from hydrogen, oxygen, nitrogen, methane, normal butane, isobutane, sulfur hexafluoride, ethane, ethylene, propane, propylene, carbon monoxide, and nitrogen monoxide may be done easily therefrom.

In a DDR type zeolite membrane according to the embodiment, it is preferable that each separation factor of $CO_2/CH_4$ in a mixed gas containing carbon dioxide ($CO_2$) and methane ($CH_4$) in an equimolar amount is 2 or more at room temperature and 100° C., respectively. More practically, the separation factor of $CO_2/CH_4$ is preferably 10 or more, and more preferably 20 or more. This allows a mixed gas of carbon dioxide and methane to be easily separated into each gas.

The separation factor of $CO_2/CH_4$ in a mixed gas of $CO_2$ and $CH_4$ refers to a value of a ratio of a gas flux of $CO_2$ to a gas flux of $CH_4$ when the mixed gas permeates a DDR type zeolite membrane at a predetermined temperature divided by a value of a ratio of a partial pressure of $CO_2$ to a partial pressure of $CH_4$ in the mixed gas. This is expressed by the following equation (1), and a value of the equation (1) is herein calculated at room temperature and 100° C.

(Separation factor of $CO_2/CH_4$)=$(Q_A/Q_B)/(P_A/P_B)$   (1)

wherein $Q_A$ denotes a gas flux (mol·m$^{-2}$·s$^{-1}$) of $CO_2$ when the mixed gas permeates the membrane at a predetermined temperature, $Q_B$ denotes a gas flux (mol·m$^{-2}$·s$^{-1}$) of $CH_4$ when the mixed gas permeates the membrane at a predetermined temperature, $P_A$ denotes a partial pressure (Pa) of $CO_2$ in the mixed gas before permeating the membrane at a predetermined temperature, and $P_B$ denotes a partial pressure (Pa) of $CH_4$ in the mixed gas before permeating the membrane at a predetermined temperature.

In a DDR type zeolite membrane according to the embodiment, it is preferable that each separation factor of $H_2/CH_4$ in a mixed gas containing hydrogen ($H_2$) and methane ($CH_4$) in an equimolar amount at room temperature and 100° C. is 2 or more, respectively. This allows the mixed gas of $H_2$ and $CH_4$ to be easily separated into each gas. The separation factor of $H_2/CH_4$ refers to a value of a ratio of a gas flux of $H_2$ to a gas flux of $CH_4$ when a mixed gas containing $H_2$ and $CH_4$ in an equimolar amount permeates a DDR type zeolite membrane at a predetermined temperature.

It is preferable that each separation factor of $C_2H_4/C_2H_6$ in a mixed gas containing ethylene ($C_2H_4$) and ethane ($C_2H_6$) in an equimolar amount at room temperature and 100° C. is 1.5 or more, respectively. This allows the mixed gas of $C_2H_4$ and $C_2H_6$ to be easily separated into each gas. The separation factor of $C_2H_4/C_2H_6$ refers to a value of a ratio of a gas flux of $C_2H_4$ to a gas flux of $C_2H_6$ when the mixed gas containing $C_2H_4$ and $C_2H_6$ in an equimolar amount permeates a DDR type zeolite membrane at a predetermined temperature.

It is preferable that each separation factor of $O_2/N_2$ in the air at room temperature and 100° C. is 1.5 or more, respectively. This allows $N_2$ and $O_2$ to be easily separated from the air. The separation factor of $O_2/N_2$ refers to a value of a ratio of a gas flux of $O_2$ to a gas flux of $N_2$ when the air permeates a DDR type zeolite membrane at a predetermined temperature divided by a value (¼) of a ratio of a partial pressure of $O_2$ to a partial pressure of $N_2$ in the air.

In a DDR type zeolite membrane according to the embodiment, a value of a ratio of a single gas permeance of carbon dioxide ($CO_2$) at room temperature and 100° C. to a single gas permeance of any one of hydrogen ($H_2$), oxygen ($O_2$), nitrogen ($N_2$), methane ($CH_4$), normal butane (n-$C_4H_{10}$), isobutane (i-$C_4H_{10}$), and sulfur hexafluoride ($SF_6$) at room temperature and 100° C. is preferably 2 or more, and more preferably 10 or more, respectively. If the value of the ratio is below 2, separation efficiency of $CO_2$ is significantly reduced, which is impractical.

The value of the ratio of the gas permeance refers to a value of a ratio of a single gas permeance of a gas A (referred to as $R_A$) to a single gas permeance of a gas B (referred to as $R_B$), that is, a calculated value of $R_A/R_B$.

In a DDR type zeolite membrane according to the embodiment, a value of a ratio of a single gas permeance of hydrogen ($H_2$) at room temperature and 100° C. to a single gas permeance of any one of oxygen ($O_2$), nitrogen ($N_2$), methane ($CH_4$), normal butane (n-$C_4H_{10}$), isobutane (i-$C_4H_{10}$), and sulfur hexafluoride ($SF_6$) at room temperature and 100° C. is preferably 2 or more, respectively. If the value of the ratio is below 2, separation of $H_2$ may sometimes become difficult.

In a DDR type zeolite membrane according to the embodiment, each value of a ratio of a single gas permeance of oxygen ($O_2$) at room temperature and 100° C. to a single gas permeance of any one of nitrogen ($N_2$), methane ($CH_4$), normal butane (n-$C_4H_{10}$), isobutane (i-$C_4H_{10}$), and sulfur hexafluoride ($SF_6$) at room temperature and 100° C. is preferably 1.1 or more, respectively. Each value of a ratio of a single gas permeance of nitrogen at room temperature and 100° C. to a single gas permeance of any one of methane, normal butane, isobutane, and sulfur hexafluoride at room temperature and 100° C. is preferably 2 or more, respectively. Each value of a ratio of a single gas permeance of methane at room temperature and 100° C. to a single gas permeance of any one of normal butane, isobutane, and sulfur hexafluoride at room temperature and 100° C. is preferably 2 or more, respectively. Each value of a ratio of a single gas permeance of normal butane at room temperature and 100° C. to a single gas permeance of isobutane or sulfur hexafluoride at room temperature and 100° C. is preferably 1.1 or more, respectively. Each value of a ratio of a single gas permeance of isobutane at room temperature and 100° C. to a single gas permeance of sulfur hexafluoride at room temperature and 100° C. is preferably 1.1 or more, respectively.

The single gas permeances of carbon dioxide ($CO_2$), hydrogen ($H_2$), oxygen ($O_2$), nitrogen ($N_2$), methane ($CH_4$), normal butane (n-$C_4H_{10}$), isobutane (i-$C_4H_{10}$), and sulfur hexafluoride ($SF_6$) at room temperature and 100° C. have the above described relationship, thus the eight types of gases can be efficiently separated using a DDR type zeolite membrane according to the embodiment.

This embodiment of the present invention (a second aspect of the present invention) is directed to a gas separation method for separating at least one type of gas component from a mixed gas containing at least two types of gases selected from a group consisting of gases capable of forming a mixed gas at room temperature and 100° C. Furthermore, it is directed to a gas separation method for separating at least one type of gas component from a mixed gas, wherein the mixed gas contains at least two types of gas components selected from a group consisting of carbon dioxide ($CO_2$), hydrogen ($H_2$), oxygen ($O_2$), nitrogen ($N_2$), water ($H_2O$), methane ($CH_4$), normal butane (n-$C_4H_{10}$), isobutane (i-$C_4H_{10}$), sulfur hexafluoride ($SF_6$), ethane ($C_2H_6$), ethylene ($C_2H_4$), propane ($C_3H_8$), propylene ($C_3H_6$), carbon monoxide (CO), and nitrogen monoxide (NO).

One may separate effectively said at least one type of gas by using this DDR type zeolite membrane according to the embodiment, since it has different single gas permeances, respectively at room temperature and 100° C. among at least two types of gases selected from a group consisting of carbon dioxide ($CO_2$), hydrogen ($H_2$), oxygen ($O_2$), nitrogen ($N_2$), water ($H_2O$), methane ($CH_4$), normal butane (n-$C_4H_{10}$), isobutane (i-$C_4H_{10}$), sulfur hexafluoride ($SF_6$), ethane ($C_2H_6$), ethylene ($C_2H_4$), propane ($C_3H_8$), and propylene ($C_3H_6$).

Specifically, one may use satisfactorily this gas separation method according to the embodiment for the selective separation of carbon dioxide ($CO_2$) from a mixed gas containing carbon dioxide and methane ($CH_4$).

Figure 6:
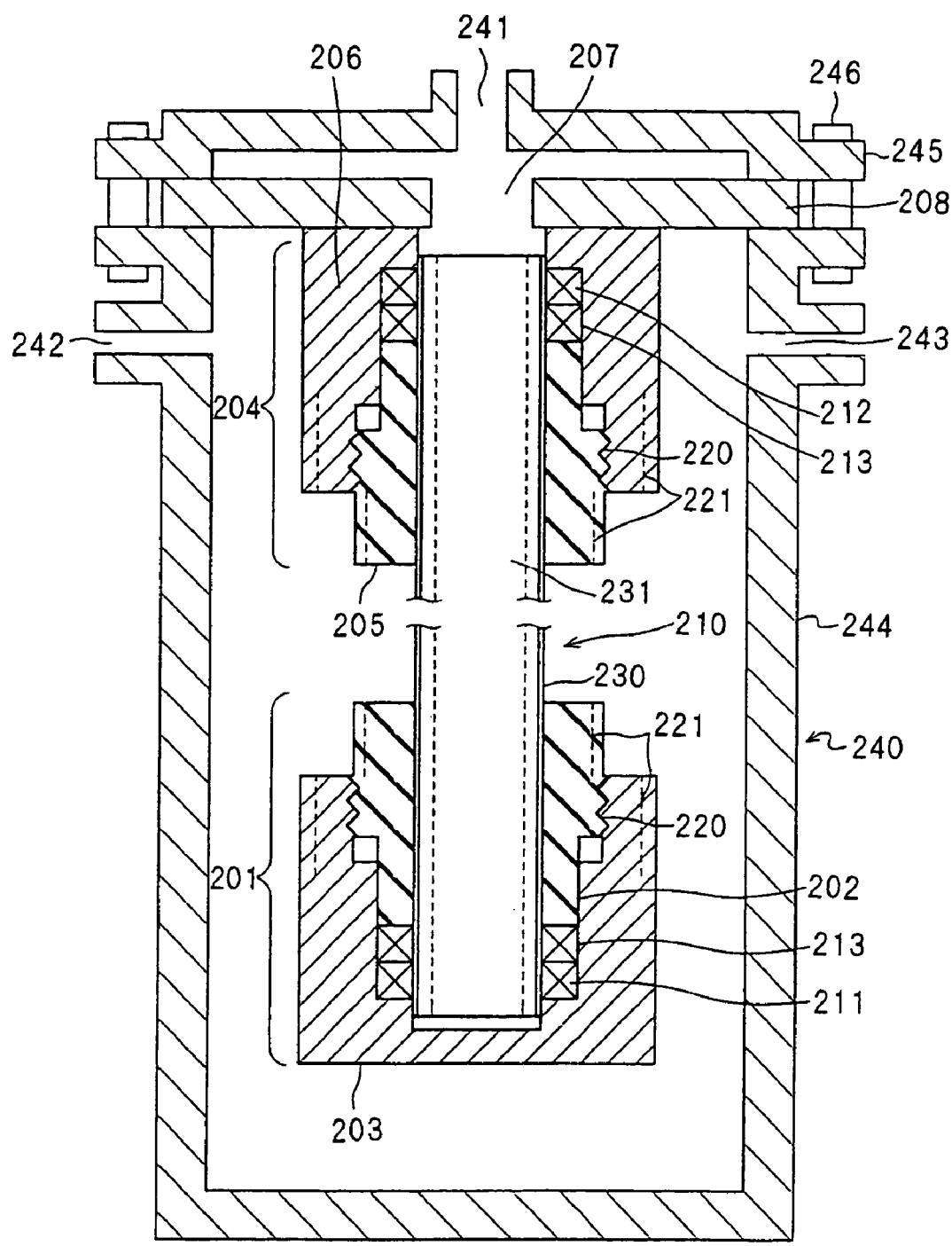
FIG. 6 shows a cross sectional view of an embodiment of a gas separation apparatus according to the present invention (a second aspect of the present invention).

FIG. 6 shows a cross sectional view of an embodiment of a gas separation apparatus according to the present invention (the second aspect of the present invention). In the gas separation apparatus 240 in FIG. 6, a cap-like metal member 201 includes an annular gland 202 and a lower cap-like stopper 203, and an annular metal member 204 includes an annular gland 205 and an upper annular stopper 206. The annular metal member 204 (the upper annular stopper) is joined to a flange 208 having a through hole 207 by welding or the like. A cap 245 is secured to a pressure vessel 244 by a securing member 246 via a flange 208.

A gas separation body 210 having a DDR type zeolite membrane 230 formed on a cylindrical porous substrate 231 is fitted between the cap-like metal member 201 and the annular metal member 204. Gland packings 211, 212 are placed as seal members in contact with an outer surface of the gas separation body 210 in the cap-like metal member 201 and the annular metal member 204. A stuffing box 213 that can house at least one gland packing 211 and one gland packing 212 may be provided, and the gland packings 211, 212 may be housed therein. However, the gland packings 211, 212 have to be in immediate contact with the outer surface of the gas separation body 210.

The annular packing glands 202, 205 can apply a fastening pressure to the gland packings 211, 212 axially of the cylindrical porous substrate 231, and the lower cap-like stopper 203 and the upper annular stopper 206 restrain axial movement of the gland packings 211, 212 caused by the application of the fastening force to the gland packings 211, 212. The gland packings 211, 212 with their movement restrained closely fit inward radially of the gas separation body 210, that is, in a direction perpendicular to a surface of the DDR type zeolite membrane 230, at an appropriate pressure with some actual deformation, to secure gas-tightness between the gas separation body 210, the cap-like metal member 201 and the annular metal member 204. The stuffing box 213 can effectively transmit the fastening pressure applied to the gland packings 211, 212 housed therein to the gas separation body 210.

A contact portion between the annular packing gland 202 and the lower cap-like stopper 203, and a contact portion between the annular gland 205 and the upper annular stopper 206 may be formed with a thread groove 220 in order to apply and hold the tightening pressure to the gland packings 211, 212. Peripheries of the annular packing glands 202, 205, the lower cap-like stopper 203, and the upper annular stopper 206 may be formed with chamfered portions 221 in order to facilitate screwing with a wrench.

The porous substrate 231 used in the gas separation apparatus according to the embodiment supports a DDR type zeolite membrane to increase mechanical strength. "Porous" herein means, for example, having three-dimensionally communicated many micropores, and a pore diameter is preferably 0.003 to 10 μm, and more preferably 0.005 to 5 μm. If a diameter is below 0.003 μm, the resistance becomes high when a gas permeates, and if a diameter exceeds 10 μm, a pin-hole tends to be formed in a DDR type zeolite membrane, which are not preferable. A porous substrate of ceramic is preferable, and a porous substrate of alumina is more preferable.

A mechanism for sealing between the cap-like metal member 201 or the annular metal member 204, and the outer surface of the gas separation body 210 does not have to be a gland packing, but seal may be made by a rubber O-ring, glass joining, brazing, an organic adhesive, or the like.

When the gas separation apparatus according to the embodiment is used to separate a mixed gas, the mixed gas is first introduced from an inlet 242 formed in a pressure vessel 244. The introduced mixed gas permeates the DDR type zeolite membrane of the gas separation body 210, and enters the gas separation body 210. The gas having permeated the DDR type zeolite membrane from the gas separation body 210 becomes a gas with a particular component concentrated (separated), and is discharged from an outlet 241 formed in a cap 245 through the through hole 207 formed in the flange 208. A gas discharged from an outflow port 243 formed in the pressure vessel 244 without permeating the DDR type zeolite membrane loses the component concentrated (separated) in the gas having permeated the DDR type zeolite membrane, and becomes a gas with other components relatively concentrated (separated).

The gas separation apparatus according to the embodiment can separate at least one type of gas component from a mixed gas containing at least two types of gas components selected from a group consisting of carbon dioxide ($CO_2$), hydrogen ($H_2$), oxygen ($O_2$), nitrogen ($N_2$), water ($H_2O$), methane ($CH_4$), normal butane (n-$C_4H_{10}$), isobutane (i-$C_4H_{10}$), sulfur hexafluoride ($SF_6$), ethane ($C_2H_6$), ethylene ($C_2H_4$), propane ($C_3H_8$), propylene ($C_3H_6$), carbon monoxide (CO), and nitrogen monoxide (NO).

The gases can be efficiently separated because the gas separation apparatus according to this embodiment is a gas separation apparatus being comprised of a DDR type zeolite membrane according to the above-mentioned embodiment, which has different single gas permeances respectively at room temperature and 100° C. among at least two types of gases selected from the group consisting of carbon dioxide ($CO_2$), hydrogen ($H_2$), oxygen ($O_2$), nitrogen ($N_2$), water ($H_2O$), methane ($CH_4$), normal butane (n-$C_4H_{10}$), isobutane (i-$C_4H_{10}$), sulfur hexafluoride ($SF_6$), ethane ($C_2H_6$), ethylene ($C_2H_4$), propane ($C_3H_8$), propylene ($C_3H_6$), carbon monoxide (CO), and nitrogen monoxide (NO).

The gas separation apparatus according to this embodiment is suitable for selectively separating carbon dioxide ($CO_2$) from a mixed gas containing carbon dioxide and methane ($CH_4$).

A third aspect of the present invention will now be described in detail with reference to the drawings.

Figure 8:
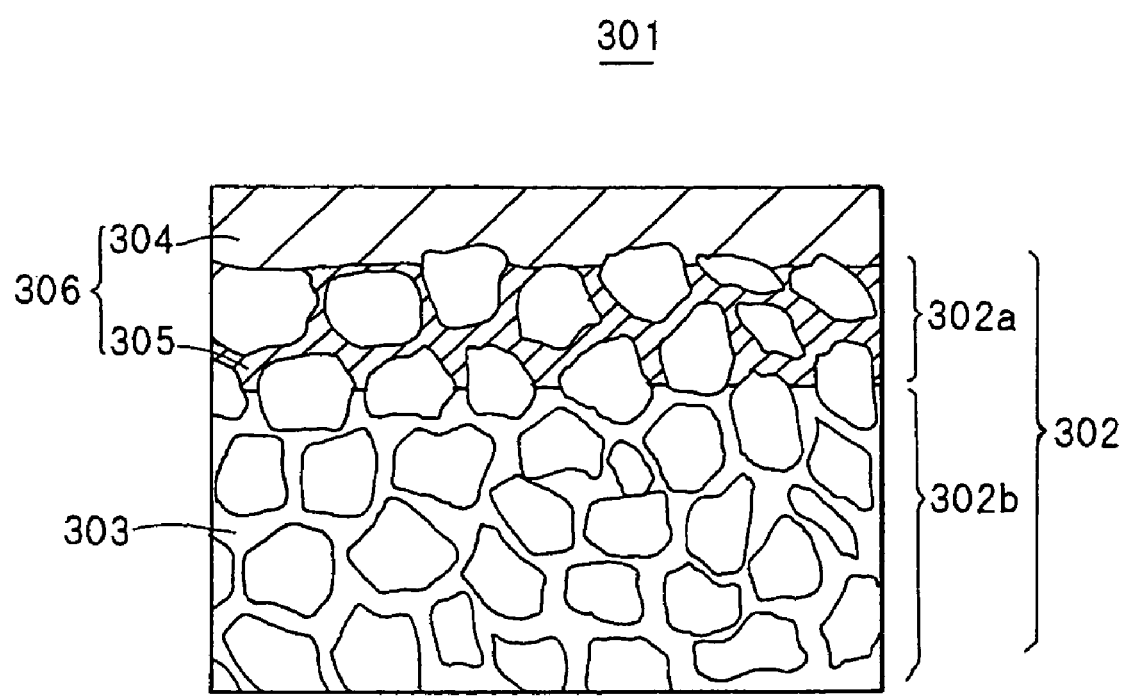
FIG. 8 shows a schematic cross sectional view of a DDR type zeolite membrane composite according to an embodiment of the present invention (a third aspect of the present invention).

An embodiment of a DDR type zeolite membrane composite according to the present invention (the third aspect of the present invention) will be described. As shown in FIG. 8, the DDR type zeolite membrane composite 301 according to the embodiment includes a porous substrate 302, and a DDR type zeolite membrane 306 made of a DDR type zeolite. The DDR type zeolite membrane 306 includes a DDR type zeolite layer deposited within pores of substrate 305 and a DDR type zeolite layer deposited outside of the substrate 304. The DDR type zeolite layer deposited within pores of substrate 305 is disposed within pores 303 of one surface of the porous substrate 302, and has a thickness 5 to 50 times of a mean pore diameter of the porous substrate. On the other hand, the DDR type zeolite layer deposited outside of the substrate 304 is disposed on a surface of the porous substrate 302 on which the DDR type zeolite layer deposited within pores of substrate 305 is disposed, and has a thickness of 30 $\mu$m or less.

In this embodiment, for example, the mean pore diameter of the porous substrate 302 is 0.6 $\mu$m, the thickness of the DDR type zeolite layer deposited within pores of substrate 305 is 10 times of the mean pore diameter of the porous substrate 302, namely, 6 $\mu$m. The thickness of the DDR type zeolite layer deposited outside of the substrate 304 is 7 $\mu$m.

Such a configuration provides high mechanical strength, can prevent occurrence of defects such as cracks due to thermal stress, and can secure a sufficient flux, for example, when the DDR type zeolite membrane composite 301 according to the embodiment is used as a gas separation membrane.

As the porous substrate 302 used in the embodiment, a porous substrate made of ceramic such as alumina, zirconia, and mullite, or glass, zeolite, clay, metal, carbon, or the like can be satisfactorily used. The mean pore diameter of the porous substrate 302 is not limited, but a porous substrate with a mean pore diameter of 0.05 to 10 $\mu$m may be satisfactorily used. For the porous substrate 302, a porous substrate 302a in an area with the DDR type zeolite layer deposited within pores of substrate 305 and a porous substrate 302b in other areas may be the same or different. In the porous substrate, the mean pore diameter on a side with a DDR type zeolite layer is preferably 0.05 to 10 $\mu$m, and the mean pore diameter on a part without a DDR type zeolite layer may be larger than the values.

A DDR type zeolite used in the embodiment is a crystal mainly containing silica, and its pore is formed by a polyhedron with an eight-membered ring of oxygen.

A forming method of a DDR type zeolite layer deposited outside of the substrate 304 according to the embodiment is not limited, for example, a DDR type zeolite layer deposited outside of the substrate 304 can be formed by immersing the porous substrate 302 in a raw material solution used for forming a DDR type zeolite to perform hydrothermal synthesis. When the porous substrate 302 is immersed in the raw material solution, the pores 303 of the porous substrate 302 are impregnated with the raw material solution to form the DDR type zeolite layer deposited within pores of substrate 305. At this time, using a raw material solution having a relatively high concentration within a range of a raw material solution used in forming a DDR type zeolite can facilitate forming the DDR type zeolite layer deposited within pores of substrate 305 within the pores 303 of the porous substrate 302.

In this embodiment, the thickness of a DDR type zeolite layer deposited within pores of substrate 305 is 5 to 50 times of the mean pore diameter of the porous substrate 302, but is more preferably 5 to 10 times thereof. If the thickness is below 5 times of the mean pore diameter, occurrence of defects such as cracks due to thermal stress cannot be restrained in a heat treatment process or the like of the DDR type zeolite membrane 306. If the thickness of the DDR type zeolite layer deposited within pores of substrate 305 exceeds 50 times of the mean pore diameter, pressure loss becomes excessive, and thus when the DDR type zeolite membrane composite 301 is used as a gas separation membrane, a sufficient flux cannot be secured. Further, depositing the DDR type zeolite within the pores 303 of the porous substrate 302 takes too much time.

In this embodiment, the thickness of the DDR type zeolite layer deposited outside of the substrate 304 disposed on the surface of the porous substrate 302 is 30 $\mu$m or less, but is more preferably 10 $\mu$m or less. When the DDR type zeolite membrane composite 301 includes the DDR type zeolite layer deposited within pores of substrate 305 with a sufficient thickness, the DDR type zeolite layer deposited outside of the substrate 304 is not always required. If the thickness of the DDR type zeolite layer deposited outside of the substrate 304 exceeds 30 $\mu$m, defects such as cracks due to thermal stress may increase in a heat treatment processing or the like of the DDR type zeolite membrane 306.

The thickness of the porous substrate 302 is not limited.

The thickness of a DDR type zeolite layer deposited outside of the substrate 304, and the thickness of the DDR type zeolite layer deposited within pores of substrate 305 may be set as desired by controlling composition of a raw material solution, synthesizing temperature, and synthesizing time.

A DDR type zeolite membrane composite 301 configured as described above can be effectively used as a gas separation membrane, and has a high separation property of carbon dioxide ($CO_2$) from methane ($CH_4$).

Next, an embodiment of a production method of a DDR type zeolite membrane composite according to the present invention (the third aspect of the present invention) will be described. The production method of a DDR type zeolite membrane composite according to the embodiment is characterized by forming a raw material solution having a mixing ratio of 1-adamantanamine to silica (1-adamantanamine (mol)/silica (mol)) of 0.03 to 0.4, and a mixing ratio of water to silica (water (mol)/$SiO_2$ (mol)) of 20 to 500, immersing a porous substrate in thus formed raw material solution for hydrothermal synthesis, and forming a DDR type zeolite layer comprising a DDR type zeolite that are deposited within pores of the substrate on at least one surface thereof and having a thickness 5 to 50 times of a mean pore diameter of the porous substrate.

In this embodiment, it is preferable to form a DDR type zeolite layer deposited outside of the substrate on a surface of the porous substrate, on which the DDR type zeolite layer deposited within pores of substrate is formed; said layer being made of a DDR type zeolite and having a thickness of 30 $\mu$m or less.

One may form easily at a low cost a DDR type zeolite membrane composite capable of providing high mechanical strength, preventing occurrence of defects such as cracks due to thermal stress, and securing a sufficient flux, when, for example, the DDR type zeolite membrane is used as a gas separation membrane, with the employment of such a configuration.

The 1-adamantanamine functions as a structure-directing agent for forming a DDR type zeolite membrane constituted by a DDR type zeolite layer deposited within pores of substrate and a DDR type zeolite layer deposited outside of the substrate. Other additives may be added to a raw material solution used in the embodiment.

As the porous substrate used in the embodiment, a porous substrate made of ceramic such as alumina, zirconia, and mullite, or glass, zeolite, clay, metal, carbon, or the like can be satisfactorily used.

In this embodiment, the mixing ratio of 1-adamantanamine to silica (1-adamantanamine (mol)/SiO$_2$ (mol)) is 0.03 to 0.4, and the mixing ratio of water to silica (water (mol)/SiO$_2$ (mol)) is 20 to 500. When the mixing ratio of 1-adamantanamine to silica is below 0.03, 1-adamantanamine as the structure-directing agent is insufficient to form a DDR type zeolite membrane, which is not preferable. When the mixing ratio of 1-adamantanamine to silica exceeds 0.4, a DDR type zeolite membrane can be formed, but 1-adamantanamine is too sufficient to act as the structure-directing agent, and the addition of expensive 1-adamantanamine in a larger amount is not preferable in view of production costs.

The mixing ratio of 1-adamantanamine to silica is preferably 0.03 to 0.25, and more preferably 0.05 to 0.125, from the viewpoint of forming a DDR type zeolite membrane considering the production costs.

It is not preferable to form a dense DDR type zeolite membrane if the mixing ratio of water to SiO$_2$ is below 20 since a silica concentration of a raw material solution is too high, and it is not preferable to form a DDR type zeolite membrane if the mixing ratio of water to silica exceeds 500 since the silica concentration of a raw material solution is too low. The mixing ratio of water to silica is preferably 20 to 224, and more preferably 28 to 112 from the viewpoint of forming the dense DDR type zeolite membrane.

A raw material solution is generally mixed to have a high concentration within a range of a raw material solution being usable for forming a DDR type zeolite. The formation of a DDR type zeolite layer deposited within pores of substrate within the pores of a porous substrate may be accelerated by using a raw material solution having such a high concentration.

A raw material solution constituted as described above with ethylenediamine added to have a mixing ratio of ethylenediamine to 1-adamantanamine (ethylenediamine (mol)/1-adamantanamine (mol)) of 8 to 32 to be prepared is preferably used as a raw material solution of the embodiment. One may dissolve easily 1-adamantanamine by preparing a raw material solution with addition of ethylenediamine, and one may form a DDR type zeolite membrane having a uniform crystal size and thickness.

In this embodiment, the thickness of a DDR type zeolite layer deposited within pores of substrate is 5 to 50 times of the mean pore diameter of the porous substrate, but is more preferably 5 to 10 times thereof. If the thickness of a DDR type zeolite layer deposited within pores of substrate is below 5 times of the mean pore diameter, the occurrence of defects such as cracks due to thermal stress cannot be restrained in a heat treatment process or the like of a DDR type zeolite membrane. If the thickness of a DDR type zeolite layer deposited within pores of substrate exceeds 50 times of the mean pore diameter, pressure loss becomes excessive, and thus when the obtained DDR type zeolite membrane composite is used as a gas separation membrane, a sufficient flux cannot be secured. Further, depositing a DDR type zeolite within the pores of the porous substrate takes too much time.

In this embodiment, the thickness of a DDR type zeolite layer deposited outside of the substrate disposed on the surface of a porous substrate is 30 $\mu$m or less, but is more preferably 10 $\mu$m or less. When a DDR type zeolite membrane composite includes a DDR type zeolite layer deposited within pores of substrate with a sufficient thickness, a DDR type zeolite layer deposited outside of the substrate is not necessarily required. If the thickness of a DDR type zeolite layer deposited outside of the substrate exceeds 30 $\mu$m, defects such as cracks due to thermal stress may increase in a heat treatment processing or the like of a DDR type zeolite membrane.

The thickness of the porous substrate used in the embodiment is not limited.

The hydrothermal synthesis in forming a DDR type zeolite is generally performed at 130 to 200° C., but hydrothermal synthesis at 140° C. to 180° C. is preferable in order to easily form a DDR type zeolite layer deposited within pores of substrate, within the pores of the porous substrate. Besides the hydrothermal synthesis temperature, one may control also the thickness of a DDR type zeolite layer deposited outside of the substrate and the thickness of the DDR type zeolite layer deposited within pores of substrate by controlling the composition of a raw material solution, or synthesizing time.

In this embodiment, one may use a raw material solution that further contains a DDR type zeolite powder to be a seed crystal as a raw material solution. A DDR type zeolite powder assists the formation of a DDR type zeolite membrane. A general stirring method may be used as a method for dispersing a DDR type zeolite powder in a raw material solution, but other methods such as ultrasonic treatment may be used, and uniform dispersion allows a denser DDR type zeolite membrane with a uniform thickness to be formed.

In this embodiment, a DDR type zeolite powder to be a seed crystal is deposited on a surface of a porous substrate to be immersed in a raw material solution, instead of dispersing a DDR type zeolite powder to be a seed crystal in a raw material solution. One may form a DDR type zeolite membrane having a more dense and uniform thickness in a short time with the employment of such a constitution.

"Depositing a DDR type zeolite powder on a porous substrate" refers to a state where a DDR type zeolite powder to be a seed crystal is disposed on a surface of the porous substrate on which a DDR type zeolite membrane is to be formed, but a firm adhesion is not necessarily required. In order to deposit a DDR type zeolite powder on the porous substrate, for example, a DDR type zeolite powder may be dispersed in water to prepare a dispersion solution with an appropriate concentration, and an appropriate amount of dispersion solution may be applied to the surface of the porous substrate on which a DDR type zeolite membrane is to be formed. One may select, as an application method, any method among the dropping method, dipping method, spin coating method, printing method, or the like depending on purposes.

EXAMPLES

Now, examples of the present invention (the first aspect of the present invention) will be described in detail, but the present invention (the first aspect of the present invention) is not limited to these examples.

Production of DDR Type Zeolite Powder (Seed Crystal)

In accordance with a production method of a DDR type zeolite described in M. J. den Exter, J. C. Jansen, H. van Bekkum, Studies in Surface Science and Catalysis, Vol. 84, Ed. by J. Weitkamp et al., Elsevier (1994), 1159–1166, a DDR type zeolite powder with a particle diameter of about 100 $\mu$m was produced. This powder was ground into fine powder with a particle diameter of 5 $\mu$m or less and used as a seed crystal.

Example 1

A jar of 100 ml capacity made of fluororesin was charged with 1.80 g of ethylenediamine (produced by Wako Pure Chemical Industries, Ltd.), and then 0.57 g of 1-adamantanamine (produced by Katayama Chemical Industries Co., Ltd.) was added and dissolved so as not to leave precipitation of 1-adamantanamine. Another beaker was charged with 73.45 g of water, were added thereto 3.0 g of 30% by mass of silica sol (Snowtex S, produced by Nissan Chemical Industries, Ltd.), and the resultant was gently stirred, and then added to the jar containing mixed ethylenediamine and 1-adamantanamine, and the resultant was vigorously shaken to prepare a raw material solution. At this time, the 1-adamantanamine/$SiO_2$ ratio was 0.25, the water/$SiO_2$ ratio was 280, and the ethylenediamine/1-adamantanamine ratio was 8.

The jar containing a raw material solution was placed in a shaker, and further shaken at 500 rpm for one hour. Then, 0.1 mg of a DDR type zeolite powder obtained by the production method of a DDR type zeolite powder was added as a seed crystal, and ultrasonically treated at 65° C. for 5 minutes to make it dispersed. Then, the raw material solution in which a DDR type zeolite powder was dispersed was transferred to a pressure resistant vessel of 100 ml capacity made of stainless with an internal cylinder made of fluororesin, a disk made of fluororesin having 35 mmφ diameter×10 mm thickness to be a support base for membrane forming was placed on a bottom of the vessel, and subjected to heat treatment (hydrothermal synthesis) at 160° C. for 5 days. After the heat treatment, the disk made of fluororesin was taken out to find that a self-supported membrane was formed on the disk. The membrane was delaminated from the disk, rinsed, dried, and then heated to 800° C. with increasing temperature at a speed of 0.1° C./min in an electric furnace in the air, and kept for 4 hours at that temperature, then cooled to room temperature at a speed of 1° C./min.

Next, a crystal phase of thus obtained membrane was examined by X-ray diffraction to evaluate the crystal phase, and a diffraction peak only of a DDR type zeolite was detected. The crystal phase was observed with an electron microscope to find that the membrane was 75 μm thick and made of polycrystal, and to confirm that the membrane was a self-supported membrane of DDR type zeolite.

"Diffraction peak of a DDR type zeolite" in the X-ray diffraction is a diffraction peak described in International Center for Diffraction Data (ICDD) "Powder Diffraction File" No. 38-651 or 41-571 corresponding to Deca-Dodecasil 3R. The crystal phase of thus formed zeolite was evaluated as "amorphous" in the case that when only broad halo but no clear peak were observed, that of the one was "still under the crystallization" in the case that when even a few peaks were observed, and that of the one was "complete crystal" in the case that sharp peaks of a DDR type zeolite with no halo was observed in the x-ray diffraction in a range of 20 to 30° (CuKα).

Examples 2 to 12, Comparative Examples 1 to 3

The formation of DDR type zeolite membranes was performed by repeating the operations similar to those of Example 1 except that composition ratios in the raw material solution and heat treatment conditions were altered. The obtained membranes were evaluated by X-ray diffraction in the same manner as in Example 1, and a thickness of them was measured by observation with the electron microscope. The composition ratios of the raw material solution (the 1-adamantanamine/$SiO_2$ ratios, the water/$SiO_2$ ratios, and the ethylenediamine/1-adamantanamine ratios), the heat treatment conditions (temperature, time), and the thicknesses of the formed DDR type zeolite membrane are shown in Table 1.

Comparative Example 4

The formation of a DDR type zeolite membrane was performed by repeating the operations similar to those of Example 1 except that DDR type zeolite powder to be a seed crystal was not used. As a result, a DDR type zeolite powder was produced, but no DDR type zeolite membrane was formed (Table 1). In Table 1, a case of using the seed crystal (DDR type zeolite powder) was indicated as "present", and a case of using no seed crystal was indicated as "absent".

TABLE 1

|  | 1-adamantanamine/ $SiO_2$ ratio (molar ratio) | Water/$SiO_2$ ratio (molar ratio) | Ethylenediamine/ 1-adamantanamine ratio (molar ratio) | Seed crystal | Heat treatment temperature (° C.) | Heat treatment time (day) | Thickness of DDR type zeolite membrane (μm) |
|---|---|---|---|---|---|---|---|
| Example 1 | 0.25 | 280 | 8 | Present | 160 | 5 | 75 |
| Example 2 | 0.1 | 50 | 8 | Present | 160 | 5 | 110 |
| Example 3 | 0.1 | 500 | 8 | Present | 160 | 5 | 80 |
| Example 4 | 0.4 | 500 | 8 | Present | 160 | 5 | 100 |
| Example 5 | 0.4 | 50 | 8 | Present | 160 | 5 | 90 |
| Example 6 | 0.05 | 70 | 8 | Present | 160 | 10 | 120 |
| Example 7 | 0.12 | 140 | 10 | Present | 160 | 5 | 80 |
| Example 8 | 0.12 | 280 | 10 | Present | 200 | 1 | 50 |
| Example 9 | 0.12 | 280 | 5 | Present | 200 | 1 | 40 |
| Example 10 | 0.25 | 280 | 8 | Present | 150 | 5 | 60 |
| Example 11 | 0.25 | 200 | 8 | Present | 180 | 2 | 70 |
| Example 12 | 0.35 | 200 | 8 | Present | 130 | 10 | 50 |
| Comparative Example 1 | 0.25 | 200 | 8 | Present | 100 | 10 | No membrane formed |
| Comparative Example 2 | 0.12 | 280 | 8 | Present | 220 | 5 | DOH phase formed |

TABLE 1-continued

|  | 1-adamantanamine/ SiO$_2$ ratio (molar ratio) | Water/SiO$_2$ ratio (molar ratio) | Ethylenediamine/ 1-adamantanamine ratio (molar ratio) | Seed crystal | Heat treatment temperature (° C.) | Heat treatment time (day) | Thickness of DDR type zeolite membrane ($\mu$m) |
|---|---|---|---|---|---|---|---|
| Comparative Example 3 | 0.12 | 300 | 3 | Present | 160 | 5 | No membrane formed |
| Comparative Example 4 | 0.25 | 280 | 8 | Absent | 160 | 5 | No membrane formed |

Example 13

The formation of DDR type zeolite membranes was performed by repeating the operations similar to those of Example 1 except that 1.50 g of ethylenediamine, 0.47 g of 1-adamantanamine, 2.50 g of 30% by mass of silica sol, and 48.70 g of water were used to prepare a raw material solution. At this time, the 1-adamantanamine/SiO$_2$ ratio was 0.25, the water/SiO$_2$ ratio was 220, and the ethylenediamine/1-adamantanamine ratio was 8.

A disk-like substrate of 15 mm$\phi$ diameter×1.5 mm thickness was prepared as a porous substrate by machining an alumna porous substrate having a mean pore diameter of 0.6 $\mu$m (produced by NGK Insulators, Ltd.). A DDR type zeolite powder obtained by the above-mentioned production method of a DDR type zeolite powder was used as a seed crystal and added to water to prepare a dispersion solution having a concentration of 1 mg/ml, and one drop of this solution was applied to one surface of the porous substrate. The porous substrate was vertically set up in a pressure resistant vessel of 100 ml capacity made of stainless with an internal cylinder made of fluororesin, and immersed in the raw material solution. The pressure resistant vessel was placed in a drier having a shaking device with an internal temperature adjusted at 150° C., and subjected to heat treatment (hydrothermal synthesis) for 5 days with the pressure resistant vessel shaken at 90 times/min. After the heat treatment, the porous substrate was taken out to find that a membrane was formed on the porous substrate. The porous substrate was rinsed, dried, and then heated to 800° C. with increasing temperature at a speed of 0.1° C./min in an electric furnace in the air, and kept for 4 hours at that temperature, then cooled to room temperature at a speed of 1° C./min.

Figure 2:
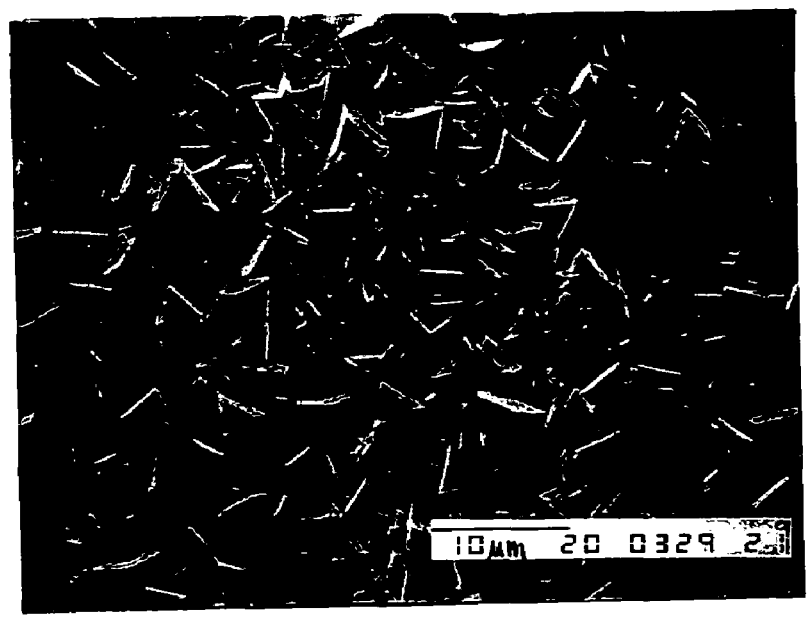
FIG. 2 shows an electron microphotograph of a surface of a DDR type zeolite membrane produced in Example 13 of the present invention (the first aspect of the present invention).

Next, a crystal phase of the obtained membrane on the porous substrate was examined by X-ray diffraction to evaluate the crystal phase, and diffraction peaks of a DDR type zeolite and the porous substrate were detected to find that the membrane was a DDR type zeolite membrane. The membrane was observed with an electron microscope to find that a 10 $\mu$m thick dense membrane was formed on the porous substrate, and to confirm that a DDR type zeolite membrane can be formed on the porous substrate. FIGS. 1 and 2 show electron microphotographs of crystal structures of a DDR type zeolite membrane produced in Example 13, and FIG. 1 shows a crystal structure on a cross section, and FIG. 2 shows a crystal structure on a surface of the membrane.

Examples 14 to 26

The formation of DDR type zeolite membranes on a porous substrate was performed by repeating the operations similar to those of Example 13 except that composition ratios in the raw material solution and heat treatment conditions were altered. The formed membranes were evaluated by X-ray diffraction the same as in Example 13, and a thickness was measured by observation with an electron microscope. The composition ratios of the raw material solution (the 1-adamantanamine/SiO$_2$ ratio, the water/SiO$_2$ ratio, and the ethylenediamine/1-adamantanamine ratio), the heat treatment conditions (temperature, time), and the thicknesses of the formed DDR type zeolite membrane are shown in Table 2.

TABLE 2

|  | 1-adamantanamine/ SiO$_2$ ratio (molar ratio) | Water/SiO$_2$ ratio (molar ratio) | Ethylenediamine/ 1-adamantanamine ratio (molar ratio) | Heat treatment temperature (° C.) | Heat treatment time (day) | Thickness of DDR type zeolite membrane ($\mu$m) |
|---|---|---|---|---|---|---|
| Example 13 | 0.25 | 220 | 8 | 150 | 5 | 10 |
| Example 14 | 0.25 | 160 | 8 | 160 | 10 | 33 |
| Example 15 | 0.4 | 220 | 5 | 160 | 5 | 25 |
| Example 16 | 0.12 | 100 | 5 | 150 | 5 | 14 |
| Example 17 | 0.31 | 280 | 8 | 150 | 5 | 11 |
| Example 18 | 0.2 | 220 | 8 | 150 | 5 | 8 |
| Example 19 | 0.25 | 340 | 10 | 150 | 5 | 12 |
| Example 20 | 0.4 | 50 | 10 | 150 | 10 | 50 |
| Example 21 | 0.25 | 280 | 8 | 150 | 10 | 20 |
| Example 22 | 0.15 | 200 | 8 | 160 | 10 | 18 |
| Example 23 | 0.12 | 50 | 8 | 160 | 5 | 22 |

TABLE 2-continued

|  | 1-adamantanamine/ SiO$_2$ ratio (molar ratio) | Water/SiO$_2$ ratio (molar ratio) | Ethylenediamine/ 1-adamantanamine ratio (molar ratio) | Heat treatment temperature (° C.) | Heat treatment time (day) | Thickness of DDR type zeolite membrane ($\mu$m) |
|---|---|---|---|---|---|---|
| Example 24 | 0.05 | 50 | 8 | 160 | 5 | 21 |
| Example 25 | 0.05 | 500 | 5 | 180 | 5 | 18 |
| Example 26 | 0.25 | 340 | 8 | 180 | 10 | 45 |

Example 27

The formation of DDR type zeolite membrane on a porous substrate was performed by repeating the operations similar to those of Example 13 except that the pressure resistant vessel was not shaken. As a result, it was found that a 5 $\mu$m thick DDR type zeolite membrane was formed on the porous substrate.

Example 28

The formation of DDR type zeolite membrane on a porous substrate was performed by repeating the operations similar to those of Example 13 except that a dispersion solution containing a DDR type zeolite powder was not applied to one surface of the porous substrate, but a seed crystal was dispersed in the raw material solution according to operations similar to Example 1. As a result, it was found that an 8 $\mu$m thick DDR type zeolite membrane was formed on a porous substrate.

Examples 29 to 36

Raw materials were mixed to have composition ratios (the 1-adamantanamine/SiO$_2$ ratio, the water/SiO$_2$ ratio, and the ethylenediamine/1-adamantanamine ratio) shown in Table 3 to prepare a raw material solution. A porous substrate was prepared that was an alumna porous body (produced by NGK Insulators, Ltd.) having a mean pore diameter of 0.6 $\mu$m machined to be a cylinder (17 mm$\phi$ outer diameter·12 mm$\phi$ inner diameter×40 mm length). A DDR type zeolite powder obtained by the above-mentioned production method of a DDR type zeolite powder was used as a seed crystal, and added to water to prepare a dispersion solution with a concentration of 1 mg/ml, and the porous substrate was dipped in the dispersion solution, and then dried at 80° C., and a DDR type zeolite powder was deposited on a surface of the porous substrate.

The porous substrate was vertically set up in a pressure resistant vessel of 100 ml capacity made of stainless with an internal cylinder made of fluororesin, and immersed in the raw material solution, and vacuum degassing treatment was performed to impregnate pores of the porous substrate with the raw material solution. Then, hydrothermal synthesis was performed under the heat treatment condition shown in Table 3 to form a DDR type zeolite membrane on the porous substrate. The formed membrane was evaluated by X-ray diffraction the same as in Example 13, and a thickness was measured by observation with an electron microscope. The composition ratios of the raw material solution, the heat treatment conditions (temperature, time), and the thicknesses of the formed DDR type zeolite membrane are shown in Table 3.

TABLE 3

|  | 1-adamantanamine/ SiO$_2$ ratio (molar ratio) | Water/SiO$_2$ ratio (molar ratio) | Ethylenediamine/ 1-adamantanamine ratio (molar ratio) | Heat treatment temperature (° C.) | Heat treatment time (day) | Thickness of DDR type zeolite membrane ($\mu$m) |
|---|---|---|---|---|---|---|
| Example 29 | 0.12 | 56 | 16 | 160 | 2 | 7 |
| Example 30 | 0.06 | 28 | 16 | 160 | 2 | 10 |
| Example 31 | 0.25 | 112 | 24 | 160 | 2 | 3 |
| Example 32 | 0.12 | 56 | 16 | 140 | 5 | 8 |
| Example 33 | 0.1 | 56 | 16 | 170 | 5 | 16 |
| Example 34 | 0.04 | 25 | 28 | 160 | 3 | 9 |
| Example 35 | 0.25 | 112 | 32 | 160 | 5 | 10 |
| Example 36 | 0.03 | 20 | 16 | 155 | 2 | 7 |

Gas Permeation Test (1)

Figure 3:
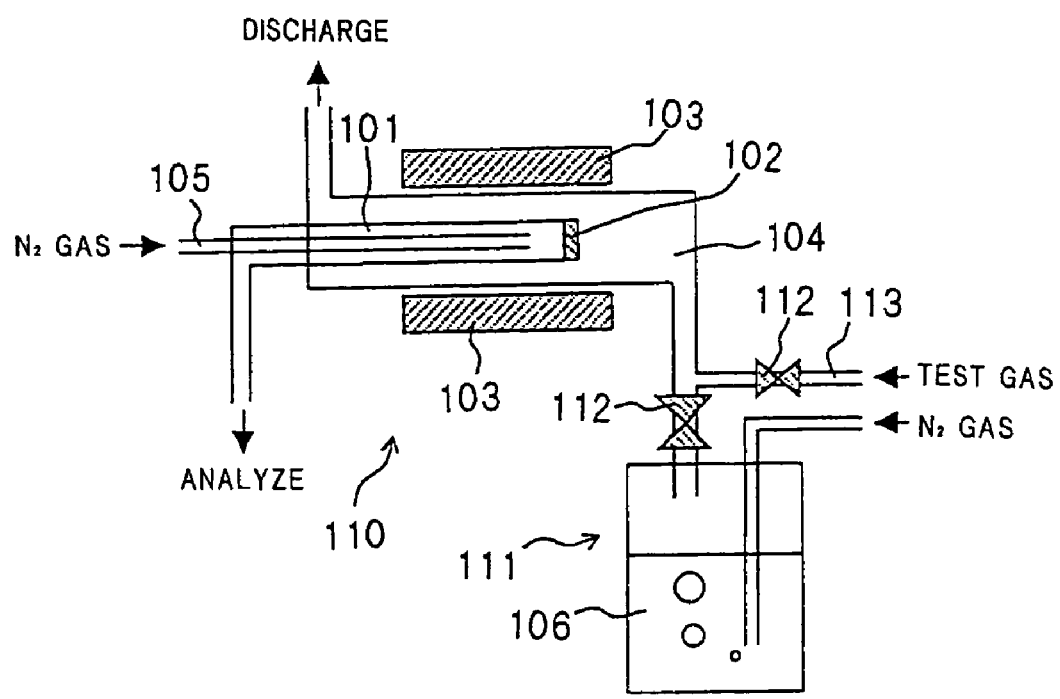
FIG. 3 schematically illustrates a configuration of a gas permeation test apparatus to be used in gas permeation tests (1) and (2) in the present invention (the first aspect of the present invention).

A gas permeation test was conducted using a DDR type zeolite membrane produced in Example 1. FIG. 3 schematically illustrates a configuration of a gas permeation test apparatus used in the gas permeation test, and shows a state where a shaped DDR type zeolite membrane 102 was attached to a tip of a measuring tube 101 (15 mm$\phi$ inner diameter) made of zirconia, and this was placed in a core tube 104 (25 mm$\phi$ inner diameter) of a tubular furnace 103, and a quartz tube 105 of 6 mm$\phi$ inner diameter was inserted into the measuring tube 101 to near a DDR type zeolite membrane 102 to provide a triple tube structure. Xylene containing isomers 106 of ortho, para, and meta mixed in an equimolar amount were introduced as a test gas via a changing valve 112 into the outside of the measuring tube 101 (inside the core tube 104) while bubbling nitrogen gas (50 ml/min) in a bubbler 111 at room temperature, and a nitrogen gas (sweep gas, 50 ml/min) for recovering a gas having permeated a DDR type zeolite membrane 102 was flown into the quartz tube 105 inside the measuring tube 101. In this state, the tubular furnace 103 was heated to a test temperature (100° C.), and kept for one hour or more to reach a steady state. The sampling gas of the recovery gas containing the gas having permeated a DDR type zeolite membrane 102 was taken, and analyzed with a gas chromatograph to evaluate a xylene gas permeance (nmol·m$^{-2}$·s$^{-1}$·Pa$^{-1}$).

Besides xylene, methane ($CH_4$) and carbon dioxide ($CO_2$) were used for permeation tests. These test gases were in gaseous form at room temperature, and thus was directly introduced into a gas inlet 113 of the core tube 104. The test results will be shown in Table 4 and FIG. 4.

TABLE 4

| Test gas | Permeance (nmol · m$^{-2}$ · s$^{-1}$ · Pa$^{-1}$) |
|---|---|
| Xylene | 2 |
| $CH_4$ | 10 |
| $CO_2$ | 226 |

Mixed Gas Permeation Test

For a DDR type zeolite membrane produced in Example 1, a gas permeation test was carried out on a mixed gas of four kind gases of methane ($CH_4$), ethyl mercaptan ($C_2H_5SH$), dimethyl sulfide (($CH_3)_2S$), and tertiary butyl mercaptan ($(CH_3)_3CSH$) (mainly containing methane with other components of 1000 ppm), using a gas permeation test apparatus 110 shown in FIG. 3 and by operations similar to the above described "gas permeation test (1)". A test temperature was 200° C. The test results are shown in Table 5 and FIG. 5.

TABLE 5

| Test gas | Permeation gas | Permeance (nmol · m$^{-2}$ · s$^{-1}$ · Pa$^{-1}$) |
|---|---|---|
| $CH_4/C_2H_5SH/(CH_3)_2S/$ | $CH_4$ | 5.2 |
| $(CH_3)_3CSH$ Mixed gas | $C_2H_5SH$ | 7.3 |
| | $(CH_3)_2S$ | 1.4 |
| | $(CH_3)_3CSH$ | 1.1 |

Gas Permeation Test (2)

For a DDR type zeolite membrane produced in Example 29, a gas permeation test was carried out using the gas permeation test apparatus shown in FIG. 3 similarly to the above described "gas permeation test (1)". A cylindrical DDR type zeolite membrane 102 with one opening end closed by an alumina plate was attached to a tip of a measuring tube 101 (17 mmφ outer diameter, 13 mmφ inner diameter) made of alumina. This was placed in a core tube 104 (25 mmφ inner diameter) of a tubular furnace 103, and a quartz tube 105 of 6 mmφ outer diameter and 4 mmφ inner diameter was inserted into the measuring tube 101 to near the DDR type zeolite membrane 102 to provide a triple tube structure. A test gas (100 ml/min) containing methane and carbon dioxide mixed in an equimolar amount was introduced outside the measuring tube 101 (inside the core tube) through a gas inlet 113, and helium gas (sweep gas, 200 ml/min) for recovering a gas having permeated the DDR type zeolite membrane 102 was flown into the quartz tube 105 inside the measuring tube 101. In this state, the tubular furnace 103 was heated to a test temperature (100° C.), and kept for one hour or more to reach a steady state. The sampling gas of the recovery gas containing the gas having permeated the DDR type zeolite membrane 102 was taken, and analyzed with a gas chromatograph to evaluate permeances (nmol·m$^{-2}$·s$^{-1}$·Pa$^{-1}$) of methane and carbon dioxide and to calculate a separation factor (carbon dioxide/methane). The separation factor of carbon dioxide/methane was 90.

Discussion

It was found, as is clear from the results shown in Tables 1 to 3, that a DDR type zeolite membrane having a sufficient thickness as a self-support membrane can be produced by adjusting the 1-adamantanamine/$SiO_2$ ratio within 0.03 to 0.4, and the ethylenediamine/1-adamantanamine ratio within 5 to 32. A DDR type zeolite membrane can be formed by adjusting the water/$SiO_2$ ratio within 20 to 500. It was also found that a DDR type zeolite membrane can be formed on the porous substrate.

For the heat treatment conditions in the hydrothermal synthesis, a DDR type zeolite membrane having a sufficient thickness can be produced at 130° C. to 200° C. in a short period such as within 10 days.

It can be taken, as is clear from the results shown in Table 3, that even if the porous substrate is cylindrical, a DDR type zeolite membrane can be formed on a surface thereof. Further, it was found that a DDR type zeolite membrane has a good separation capability of a mixed gas of carbon dioxide/methane (a separation factor of carbon dioxide/methane=90).

Figure 4:
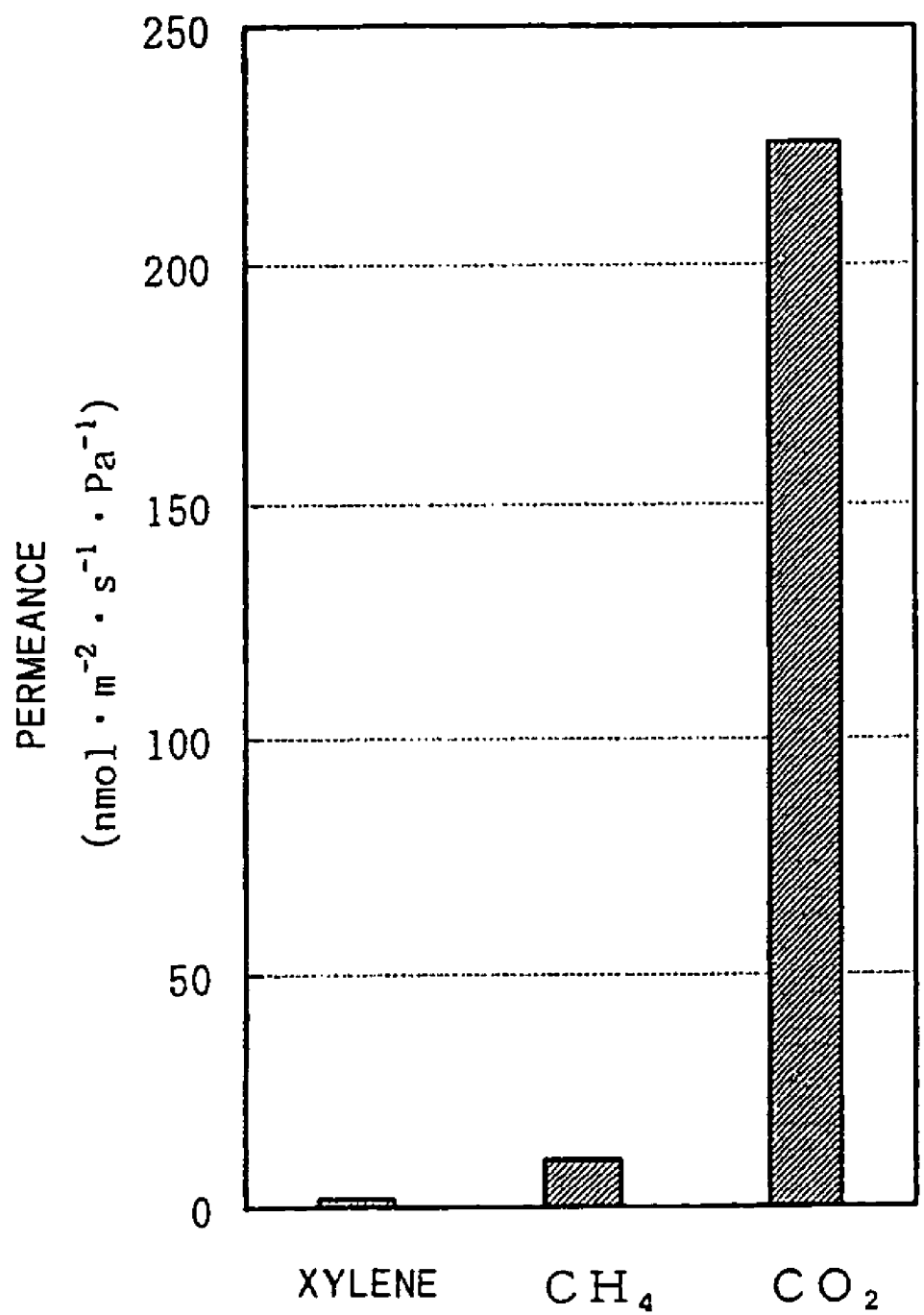
FIG. 4 shows a bar graph of permeances of permeation gases in the gas permeation test (1) in the present invention (the first aspect of the present invention).

It was found, as is clear from the results shown in Table 4 and FIG. 4, that xylene hardly permeated a DDR type zeolite membrane, but carbon dioxide and methane permeated, and carbon dioxide showed a permeation of about 20 times higher than that of methane. This may depend on pore diameter of a DDR type zeolite membrane and a molecule diameter of the test gas.

Figure 5:
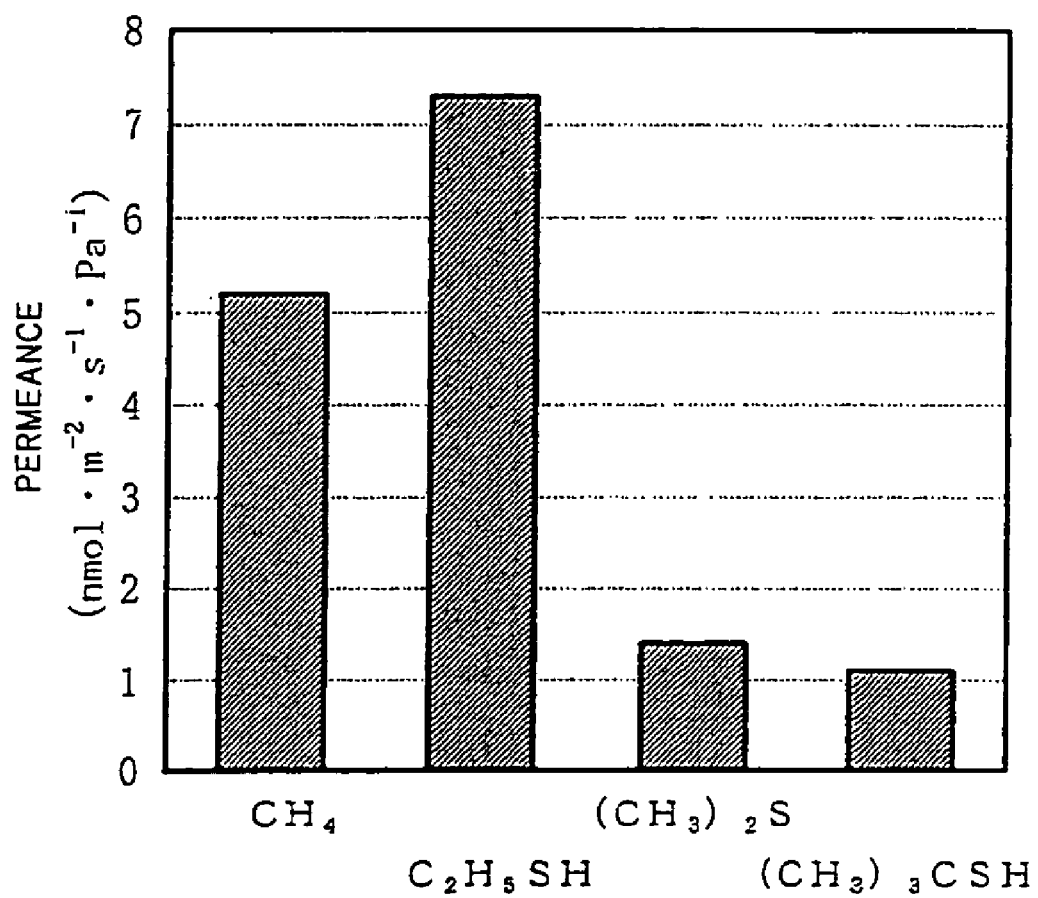
FIG. 5 shows a bar graph of permeances of permeation gases in a mixed gas permeation test in the present invention (the first aspect of the present invention).

It was found, as is clear from the results shown in Table 5 and FIG. 5, that dimethyl sulfide and tertiary butyl mercaptan having a relatively large molecule diameter, compared to methane and ethyl mercaptan having a relatively small molecule diameter, have low permeation. That is, the obtained DDR type zeolite membrane has a good separation capability of dimethyl sulfide and tertiary butyl mercaptan from methane, and thus can be used for separation of, for example, a mixed gas of dimethyl sulfide and methane, or a mixed gas of tertiary butyl mercaptan and methane.

Therefore, from the results of the gas permeation test and the mixed gas permeation test, a molecular sieving action of a DDR type zeolite membrane produced by the production method according to the present invention (the first aspect of the present invention) and its availability (gas separation property) could be confirmed.

Now, examples of the present invention (the second aspect of the present invention) will be described in detail, but the present invention (the second aspect of the present invention) is not limited to the examples.

Example 37

A jar of 100 ml capacity made of fluororesin was charged with ethylenediamine (produced by Wako Pure Chemical Industries, Ltd.), and then 1-adamantanamine (produced by Katayama Chemical Industries Co., Ltd.) was added to dissolve 1-adamantanamine thoroughly. Another beaker was charged with ion-exchanged water, 30% by mass of silica sol (produced by Nissan Chemical Industries, Ltd., trade name: Snowtex S) was added and gently stirred, and then added to the above described jar and the resultant was vigorously shaken to prepare a raw material solution. At this time, the 1-adamantanamine/$SiO_2$ ratio (molar ratio) was 0.0625, the water/$SiO_2$ ratio (molar ratio) was 42, and the ethylenediamine/1-adamantanamine ratio (molar ratio) was 16. The jar containing the raw material solution was placed in a shaker, and further shaken at 500 rpm for one hour.

A disk-like porous substrate of 15 mm$\phi$ diameter×1.5 mm thickness was prepared as a porous substrate by machining an alumna porous substrate having a mean pore diameter of 0.6 μm (produced by NGK Insulators, Ltd.). A dispersion solution in which a DDR type zeolite powder is dispersed in the ion-exchanged water was prepared, and applied to one surface of the porous substrate.

The porous substrate was vertically set up in a pressure resistant vessel of 100 ml capacity made of stainless with an internal cylinder made of fluororesin, and immersed in the raw material solution. The pressure resistant vessel was placed in a drying oven having an internal temperature adjusted at 160° C., and subjected to heat treatment (hydrothermal synthesis) for 46 hours.

After the heat treatment, the porous substrate was taken out to find that a membrane was formed on the porous substrate. The porous substrate was rinsed, dried, and then heated to 800° C. with increasing temperature at a speed of 0.1° C./min in an electric furnace in the air, and kept for 4 hours at that temperature, then cooled to room temperature at a speed of 1° C./min.

Next, a crystal phase of a membrane on the obtained porous substrate was examined by X-ray diffraction to evaluate the crystal phase, and diffraction peaks of a DDR type zeolite and the porous substrate were detected to find that the membrane was a DDR type zeolite membrane. The membrane was observed with an electron microscope to find that a 5 μm thick dense membrane was formed on the porous substrate.

Single Gas Permeation Test

Figure 7:
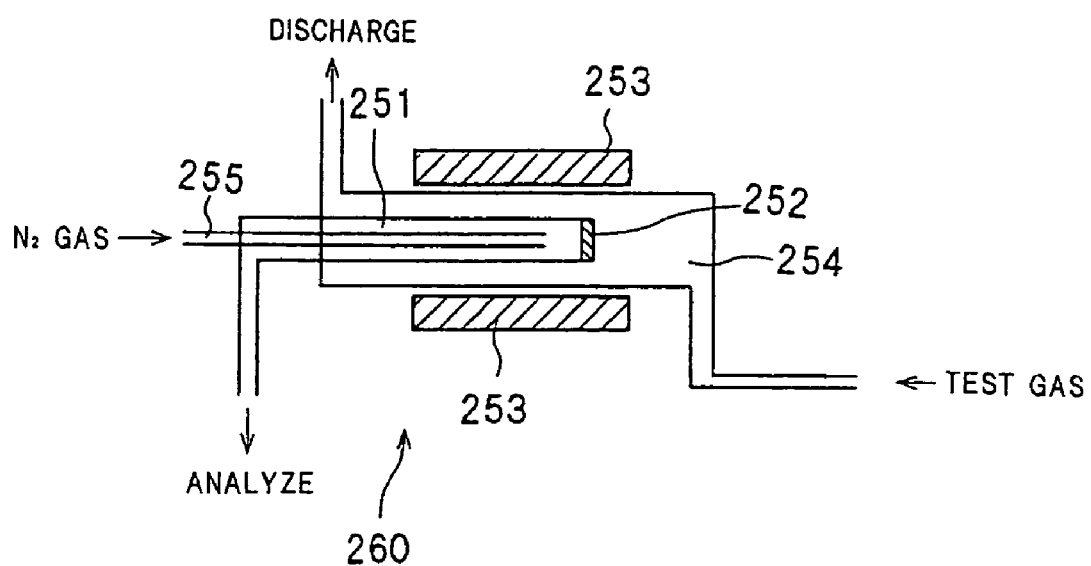
FIG. 7 schematically illustrates a configuration of a gas permeation test apparatus to be used in a gas permeation test in the present invention (the second aspect of the present invention).

A gas permeation test was conducted using a DDR type zeolite membrane produced in Example 37. FIG. 7 schematically illustrates a configuration of a gas permeation test apparatus 260 used in the gas permeation test, and shows a state where a DDR type zeolite membrane produced in Example 37 and formed on the porous substrate was attached to a tip of a measuring tube 251 (15 mm$\phi$ outer diameter) made of alumina, and this was placed in a core tube 254 (25 mm$\phi$ inner diameter) of a tubular furnace 253, and a quartz tube 255 of 6 mm$\phi$ inner diameter was inserted into the measuring tube 251 to near the DDR type zeolite membrane 252 to provide a triple tube structure. A test gas was introduced into the outside of the measuring tube 251 (the inside of the core tube 254), and nitrogen gas (sweep gas) for recovering a gas having permeated the DDR type zeolite membrane 252 was flown into the quartz tube 255 inside the measuring tube 251. In this state, a temperature in the tubular furnace was adjusted to a predetermined degree, and kept for one hour or more to reach a steady state. The sampling gas of the recovery gas containing the gas having permeated the DDR type zeolite membrane 252 was taken, and analyzed with a gas chromatograph to evaluate a permeance (mol·m$^{-2}$·s$^{-1}$·Pa$^{-1}$) of the gas having permeated the membrane. The test results are shown in Tables 6 and 7. In Table 7, values of ratios of "single gas permeances of gas components described in A ($CO_2$, $H_2$, $O_2$, $N_2$, $CH_4$, n-$C_4H_{10}$, i-$C_4H_{10}$)" to "single gas permeances of gas components described in B ($H_2$, $O_2$, $N_2$, $CH_4$, n-$C_4H_{10}$, i-$C_4H_{10}$, $SF_6$)" are indicated. A top in each cell shows a value at room temperature (26° C.), and a bottom shows a value at 100° C.

(Unit: $10^{-9}$ mol·m$^{-2}$·s$^{-1}$·Pa$^{-1}$)

TABLE 6

| Gas type | Temperature 26° C. | Temperature 100° C. |
|---|---|---|
| $CO_2$ | 48 | 18.7 |
| $H_2$ | 7.8 | 6.6 |
| $O_2$ | 2.8 | 1.6 |
| $N_2$ | 2.2 | 1.4 |
| $CH_4$ | 0.054 | 0.060 |
| n-$C_4H_{10}$ | 0.0033 | 0.0036 |
| i-$C_4H_{10}$ | 0.0027 | 0.0028 |
| $SF_6$ | 0.0022 | 0.0021 |

Single Gas Permeance Ratio (A/B)

TABLE 7

| B\A | $H_2$ | $O_2$ | $N_2$ | $CH_4$ | n-$C_4H_{10}$ | i-$C_4H_{10}$ | $SF_6$ |
|---|---|---|---|---|---|---|---|
| $CO_2$ | 6.2 | 17 | 22 | 890 | 15000 | 18000 | 22000 |
|  | 2.8 | 12 | 13 | 310 | 5200 | 6700 | 8900 |
| $H_2$ |  | 2.8 | 3.5 | 140 | 2400 | 2900 | 3500 |
|  |  | 4.1 | 4.7 | 110 | 1800 | 2400 | 3100 |
| $O_2$ |  |  | 1.3 | 52 | 850 | 1000 | 1300 |
|  |  |  | 1.1 | 27 | 440 | 570 | 760 |
| $N_2$ |  |  |  | 41 | 670 | 820 | 1000 |
|  |  |  |  | 23 | 390 | 500 | 670 |
| $CH_4$ |  |  |  |  | 16 | 20 | 25 |
|  |  |  |  |  | 17 | 21 | 29 |
| n-$C_4H_{10}$ |  |  |  |  |  | 1.2 | 1.5 |
|  |  |  |  |  |  | 1.7 | 1.7 |
| i-$C_4H_{10}$ |  |  |  |  |  |  | 1.2 |
|  |  |  |  |  |  |  | 1.3 |

Top: 26° C., Bottom: 100° C.

Mixed Gas Permeation Test

A gas permeation test was conducted on mixed gases (equimolar mixed gases) shown in Table 8 as test gases, using the gas permeation test apparatus 260 shown in FIG. 7 and by operations similar to the above described single gas permeation test. The test results are shown in Table 8.

TABLE 8

| Equimolar mixed gas | Separation factor 26° C. | Separation factor 100° C. |
|---|---|---|
| $CO_2/CH_4$ | 670 | 340 |
| $H_2/CH_4$ | 130 | 94 |
| $C_2H_4/C_2H_6$ | 5.8 | 3.3 |

Air Permeation Test

An air permeation test was conducted using the gas permeation test apparatus 260 shown in FIG. 7 and by operations similar to the above described single gas permeation test. The test results will be shown in Table 9. A separation factor α of $O_2/N_2$ was calculated by an equation (2) from a gas flux obtained by the air permeation test.

$$\alpha = (Q_A/Q_B)/(P_A/P_B) \tag{2}$$

wherein $Q_A$ and $Q_B$ are fluxes (mol·m$^{-2}$·s$^{-1}$) of a gas A and a gas B, $P_A$ and $P_B$ are partial pressures (Pa) in the test gases A and B. In this air permeation test, the gas A is oxygen, and the gas B is nitrogen.

That is, the separation factor was calculated from each value of a ratio of a gas flux of $O_2$ at room temperature and 100° C. to a gas flux of $N_2$ at room temperature and 100° C., when the air permeates a DDR type zeolite membrane, divided by a value (¼) of a ratio of a partial pressure of $O_2$ to a partial pressure of $N_2$ in the air, respectively.

TABLE 9

| | Separation factor | |
|---|---|---|
| | 26° C. | 100° C. |
| $O_2/N_2$ | 1.8 | 1.6 |

It was found that, according to a DDR type zeolite membrane of the present invention, one or more types of particular gas components can be separated from a mixed gas containing two or more types of particular gas components, since it has different single gas permeances respectively as to at least two types of gases selected from a group consisting of a plurality of particular gases.

Now, examples of the present invention (the third aspect of the present invention) will be described in detail, but the present invention (the third aspect of the present invention) is not limited to the examples.

Production of DDR Type Zeolite Powder (Seed Crystal)

In accordance with a production method of DDR type zeolite described in M. J. den Exter, J. C. Jansen, H. van Bekkum, Studies in Surface Science and Catalysis, Vol. 84, Ed. by J. Weitkamp et al., Elsevier (1994), 1159–1166, a DDR type zeolite powder with a crystal size of about 100 μm was produced. This powder was ground into fine powder with a size of 5 μm or less and used as a seed crystal.

Example 38

A jar of 100 ml capacity made of fluororesin was charged with 6.01 g of ethylenediamine (produced by Wako Pure Chemical Industries, Ltd.), and then 0.95 g of 1-adamantanamine (produced by Katayama Chemical Industries Co., Ltd.) was added and dissolved so as not to leave precipitation of 1-adamantanamine. Another beaker was charged with 43.41 g of water and 10.01 g of 30% by mass of silica sol (produced by Nissan Chemical Industries, Ltd., trade name: Snowtex S) and gently stirred, and then added to the jar containing mixed ethylenediamine and 1-adamantanamine, and the resultant was vigorously shaken to prepare a raw material solution. At this time, the mixing ratio of 1-adamantanamine to silica (1-adamantanamine (mol)/$SiO_2$ (mol)) was 0.125, the mixing ratio of water to silica (water (mol)/$SiO_2$ (mol)) was 56, and the mixing ratio of ethylenediamine to 1-adamantanamine (ethylenediamine (mol)/1-adamantanamine (mol)) was 16.

A disk-like substrate of 15 mmφ diameter×1.5 mm thickness was prepared as a porous substrate by machining an alumna porous substrate having a mean pore diameter of 0.6 μm (produced by NGK Insulators, Ltd.). A DDR type zeolite powder was used as a seed crystal, and added to water to prepare a dispersion solution with a concentration of 1 mg/ml, and the dispersion solution was applied to one surface of the porous substrate. The porous substrate was vertically set up in a pressure resistant vessel of 100 ml capacity made of stainless with an internal cylinder made of fluororesin, and immersed in the raw material solution. The pressure resistant vessel was placed in a drying oven having an internal temperature adjusted at 160° C., and subjected to hydrothermal synthesis for 48 hours to form a DDR type zeolite membrane composite having a zeolite layer deposited outside of the substrate formed on a surface of the porous substrate, and having a zeolite layer deposited within pores of substrate formed within the pores of the surface of the porous substrate on which a DDR type zeolite layer deposited outside of the substrate is disposed.

After the hydrothermal synthesis, a DDR type zeolite membrane composite was rinsed, dried, and then heated to 800° C. with increasing temperature at a speed of 0.1° C./min in an electric furnace in the air, and kept for 4 hours at that temperature, then cooled to room temperature at a speed of 1° C./min to form a DDR type zeolite membrane composite having no organic molecule as a structure-directing agent.

Next, a crystal phase of a zeolite membrane on the porous substrate that constitutes the obtained DDR type zeolite membrane composite was examined by X-ray diffraction to evaluate the crystal phase, and diffraction peaks of a DDR type zeolite and the porous substrate were detected to find that the zeolite membrane disposed on the porous substrate was a DDR type zeolite membrane.

Figure 9:
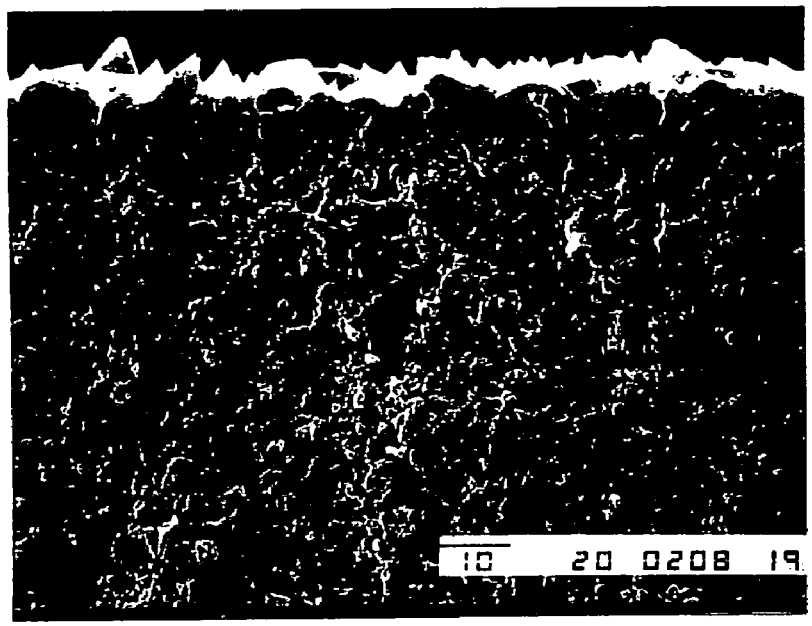
FIG. 9 shows an electron microphotograph of a cross section of a DDR type zeolite membrane composite produced in Example 38 of the present invention (the third aspect of the present invention).
Figure 10:
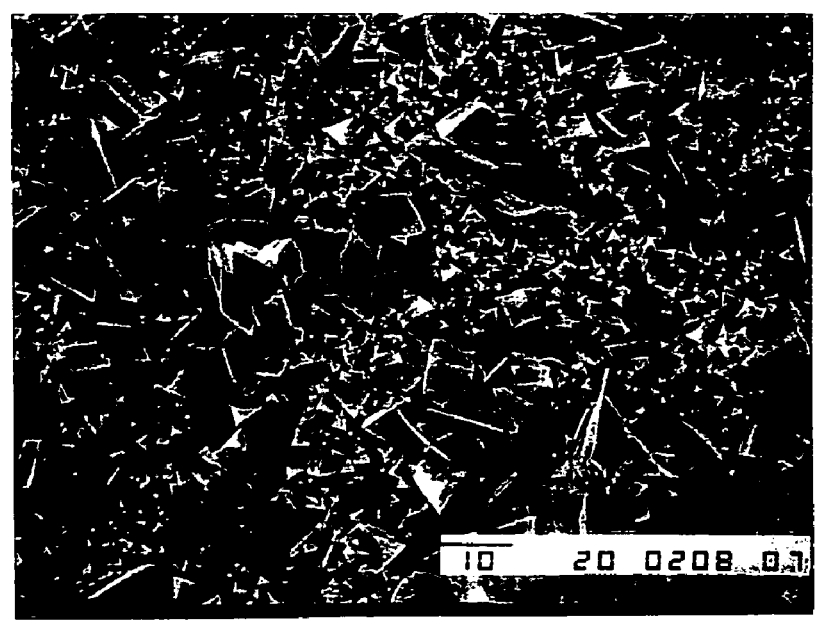
FIG. 10 shows an electron microphotograph of a surface of a DDR type zeolite membrane composite produced in Example 38 of the present invention (the third aspect of the present invention).

"Diffraction peak of a DDR type zeolite" in the X-ray diffraction is a diffraction peak described in International Center for Diffraction Data (ICDD) "Powder Diffraction File" No. 38-651 or 41-571 corresponding to Deca-Dodecasil 3R. The membrane was observed with an electron microscope to find that a 7 μm thick dense DDR type zeolite layer deposited outside of the substrate was formed on the porous substrate. A 6 μm thick DDR type zeolite layer deposited within pores of substrate made of a DDR type zeolite was formed within pores of a surface of the porous substrate on which a DDR type zeolite layer deposited outside of the substrate was formed. FIGS. 9 and 10 are electron microphotographs of shapes of a DDR type zeolite membrane composite produced in Example 38, and FIG. 9 shows a shape on a cross section of a DDR type zeolite membrane composite, and FIG. 10 shows a shape on a surface of a DDR type zeolite membrane composite.

Examples 39 to 48, Comparative Examples 5 to 9

The formation of a DDR type zeolite membrane composite was preformed by repeating operations similar to those of Example 38 except that composition ratios of the raw material solution, amounts of the raw material solution, heat treatment conditions, and shapes of the porous substrate were altered. A porous substrate in the form of a disk used in Example 38 and a porous substrate machined to be a tube of 17 mmφ outer diameter×2.5 mm thickness were prepared as a porous substrate. The formed DDR type zeolite membrane was evaluated by X-ray diffraction the same as in Example 38, and the thickness of a DDR type zeolite layer deposited within pores of substrate and the thickness of a DDR type zeolite layer deposited outside of the substrate were measured by observation with an electron microscope. The composition ratios of the raw material solution (1-adamantanamine (mol)/silica (mol), ethylenediamine (mol)/silica (mol), and ethylenediamine (mol)/1-adamantanamine (mol)), the substrate shapes, the heat treatment conditions (temperature, time), and the thicknesses of the formed DDR type zeolite layer deposited outside of the substrate, and the thicknesses of a DDR type zeolite layer deposited within pores of substrate are shown in Table 10.

TABLE 10

| | 1-adamantanamine/ silica (molar ratio) | Ethylenediamine/ 1-adamantanamine (molar ratio) | Water/ silica (molar ratio) | Hydrothermal synthesis temperature (° C.) | Hydrothermal synthesis time (hour) | Shape of porous substrate | Mean pore diameter of porous substrate ($\mu$m) | Thickness of DDR type zeolite layer deposited outside of the substrate ($\mu$m) | Thickness of DDR type zeolite layer deposited within pores of substrate ($\mu$m) | Separation factor of $CO_2/CH_4$ at 100° C. |
|---|---|---|---|---|---|---|---|---|---|---|
| Example 38 | 0.125 | 16 | 56 | 160 | 48 | Disk | 0.6 | 7 | 6 | 226 |
| Example 39 | 0.0625 | 16 | 28 | 160 | 48 | Disk | 0.6 | 10 | 5 | 174 |
| Example 40 | 0.25 | 16 | 112 | 160 | 48 | Disk | 0.6 | 5 | 3 | 46 |
| Example 41 | 0.0625 | 16 | 56 | 160 | 48 | Disk | 0.6 | 5 | 3 | 132 |
| Example 42 | 0.25 | 32 | 112 | 160 | 72 | Disk | 0.6 | 3 | 3 | 66 |
| Example 43 | 0.25 | 16 | 224 | 160 | 72 | Disk | 0.6 | 5 | 5 | 59 |
| Example 44 | 0.5 | 16 | 224 | 160 | 72 | Disk | 0.6 | 7 | 6 | 383 |
| Example 45 | 0.125 | 16 | 56 | 160 | 72 | Tube | 0.6 | 9 | 5 | 78 |
| Example 46 | 0.125 | 16 | 56 | 160 | 72 | Tube | 0.6 | 10 | 5 | 57 |
| Example 47 | 0.25 | 8 | 112 | 160 | 48 | Disk | 0.6 | 13 | 3 | 4 |
| Example 48 | 0.125 | 16 | 112 | 160 | 48 | Disk | 0.6 | 5 | 3 | 3 |
| Comp. Example 5 | 0.25 | 16 | 224 | 160 | 48 | Disk | 0.6 | 2 | 2 | 1 |
| Comp. Example 6 | 0.5 | 16 | 224 | 160 | 48 | Disk | 0.6 | 3 | 2 | 1 |
| Comp. Example 7 | 0.25 | 32 | 112 | 160 | 48 | Disk | 0.6 | No membrane formed | 0 | 1 |
| Comp. Example 8 | 0.25 | 32 | 224 | 160 | 72 | Tube | 0.6 | 5 | 2 | 3 |
| Comp. Example 9 | 0.25 | 32 | 224 | 160 | 72 | Tube | 0.6 | 5 | 2 | 1 |

Gas Permeation Test

A gas permeation test was conducted using the DDR type zeolite membrane composites produced in Examples 39 to 48, and Comparative Examples 5 to 9.

Figure 11:
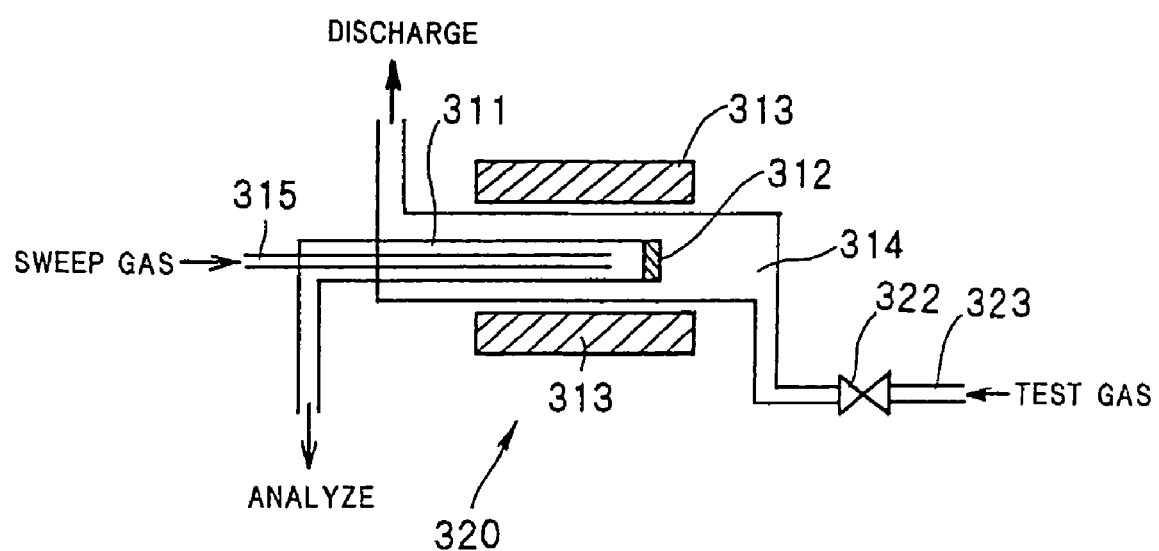
FIG. 11 schematically illustrates a configuration of a gas permeation test apparatus to be used in a gas permeation test in the present invention (the third aspect of the present invention).

FIG. 11 schematically illustrates a configuration of a gas permeation test apparatus 320 used in a gas permeation test, and shows a state where a DDR type zeolite membrane composite 312 was attached to a tip of a measuring tube 311 (15 mm$\phi$ inner diameter) made of alumina, and this was placed in a core tube 314 (25 mm$\phi$ inner diameter) of a tubular furnace 313, and a quartz tube 315 of 6 mm$\phi$ inner diameter was inserted into the measuring tube 311 to near the DDR type zeolite membrane composite 312 to provide a triple tube structure. A mixed gas of methane ($CH_4$) and carbon dioxide ($CO_2$) was directly introduced into the core tube 314 of the gas permeation test apparatus thus configured through a gas inlet 323 that can be divided by the core tube 314 and a valve 322. A feeding speed of the mixed gas was 50 ml/min when the porous substrate was in the form of a disk, and 100 ml/min when the porous substrate was in the form of a tube.

Helium gas (sweep gas; 100 ml/min for the disk substrate, and 200 ml/min for the tube substrate) for recovering a gas having permeated the DDR type zeolite membrane composite 312 was flown into the quartz tube 315 inside the measuring tube 311. In this state, the tubular furnace 313 was heated to a test temperature (100° C.), and kept for one hour or more to reach a steady state. The sampling gas of the recovery gas containing the gas having permeated the DDR type zeolite membrane composite 312 was taken, and analyzed with a gas chromatograph to evaluate permeances of methane and carbon dioxide (nmol·m$^{-2}$·s$^{-1}$·Pa$^{-1}$). A separation factor of $CO_2/CH_4$ at 100° C. will be shown in Table 10. A separation factor $\alpha$ of $CO_2/CH_4$ was calculated by an equation (3).

$$\alpha = (Q_{A'}/Q_{B'})/(P_A/P_B) \qquad (3)$$

In the equation (3), $Q_{A'}$ is a permeance (nmol·m$^{-2}$·s$^{-1}$·Pa$^{-1}$) of $CO_2$, $Q_{B'}$ is a permeance (nmol·m$^{-2}$·s$^{-1}$·Pa$^{-1}$) of $CH_4$, $P_A$ is a partial pressure (Pa) of $CO_2$ in the test gas, and PB is a partial pressure (Pa) of $CH_4$ in the test gas.

Discussion

As is clear from the results shown in Table 10, one may form a DDR type zeolite membrane composite comprising a DDR type zeolite layer deposited within pores of substrate having a thickness 5 times (3 μm) or more of the mean pore diameter (0.6 μm) of the porous substrate used in this embodiment, a $CO_2/CH_4$ separation factor of 2 or more at 100° C., and usable as a gas separation membrane by adjusting the mixing ratio of 1-adamantanamine to silica within 0.03 to 0.5, the mixing ratio of ethylenediamine to 1-adamantanamine within 5 to 32, and the mixing ratio of water to silica within 20 to 500 (Examples 38 to 48).

It was confirmed, as is clear from the results shown in Table 10, that a DDR type zeolite membrane composite having the DDR type zeolite layer deposited within pores of substrate of 3 μm thickness or more, and the $CO_2/CH_4$ separation factor of 2 or more at 100° C., especially, a DDR type zeolite membrane composite having the DDR type zeolite layer deposited within pores of substrate of 5 μm thickness or more, and a $CO_2/CH_4$ separation factor of 50 or more at 100° C., can be satisfactorily used as a gas separation membrane (Examples 38, 39, 43 to 46). A permeation speed of molecules becomes lower as the DDR type zeolite layer deposited within pores of substrate becomes thicker, thus the thickness of the DDR type zeolite layer deposited within pores of substrate is preferably within 3 to 6 μm when the porous substrate having the mean pore diameter of 0.6 μm is used.

Figure 12:
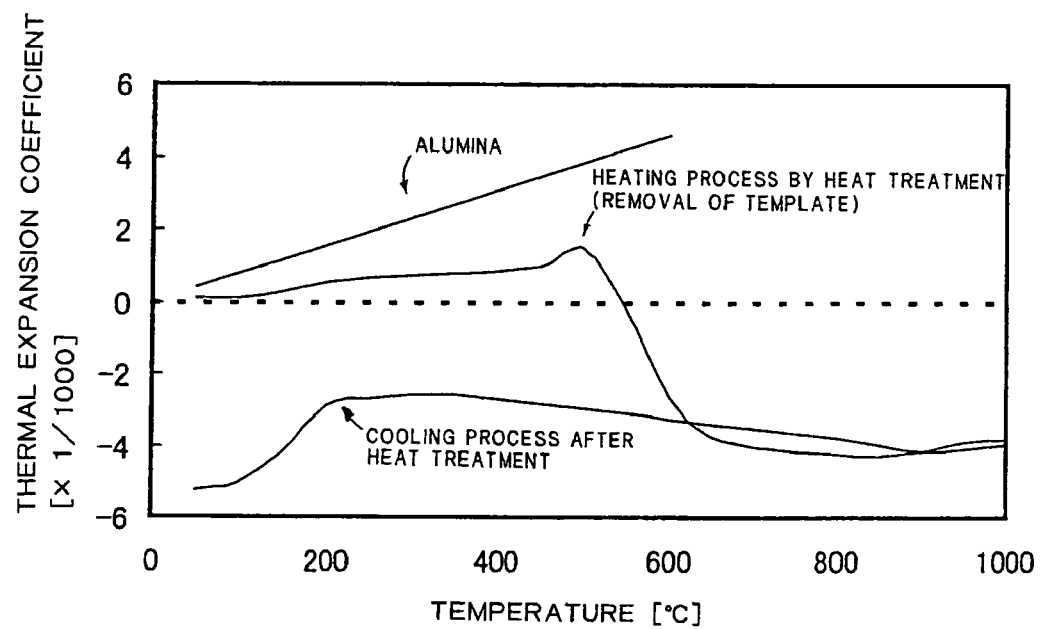
FIG. 12 shows thermal expansion behaviors of a DDR type zeolite and alumina in the present invention (the third aspect of the present invention).

DDR type zeolite membrane composites according to Examples 38 to 48 having the DDR type zeolite layer deposited within pores of substrate of 3 μm thickness or more has a high $CO_2/CH_4$ separation factor at 100° C., thus it can be assumed that occurrence of defects such as cracks are restrained even after heat treatment (calcination) for removing the structure-directing agent. FIG. 12 is a graph of thermal expansion behaviors of a DDR type zeolite and alumina. As shown in FIG. 12, the thermal expansion behaviors significantly differ between a DDR type zeolite and alumina. Thus, it can be assumed that when the thickness of a DDR type zeolite layer deposited within pores of substrate is below 5 times of the mean pore diameter, that is, when a DDR type zeolite layer is less than 3 μm, there is the large difference in the thermal expansion behaviors between a DDR type zeolite and an alumina substrate, thus the heat treatment causes the formation of defects, and reduces molecule separation capability as in Comparative Examples 5 to 9. On the other hand, it can be assumed that when the thickness of a DDR type zeolite layer deposited within pores of substrate is 3 μm or more, preferably 5 μm or more, a DDR type zeolite layer deposited within pores of substrate reduces the difference in the thermal expansion behaviors between a DDR type zeolite membrane and the alumina substrate (porous substrate), thus restraining occurrence of defects after heat treatment.

INDUSTRIAL APPLICABILITY

A DDR type zeolite membrane according to the present invention makes one or more kind of particular gases permeate selectively from a mixed gas containing particular gas components by a molecular sieving effect, thus can be satisfactorily used as a gas separation membrane. For example, a DDR type zeolite membrane is suitable for selectively separating carbon dioxide ($CO_2$) from a mixed gas of carbon dioxide and methane ($CH_4$) such as a natural gas. A DDR type zeolite membrane may be used as a membrane reactor in combination with a catalyst.

What is claimed:

1. A gas separation method for separating at least one type of gas component from a mixed gas containing at least two types of gas components selected from a group consisting of carbon dioxide ($CO_2$), hydrogen ($H_2$), oxygen ($O_2$), nitrogen ($N_2$), methane ($CH_4$), normal butane (n-$C_4H_{10}$), isobutane (i-$C_4H_{10}$), sulfur hexafluoride ($SF_6$), ethane ($C_2H_6$), ethylene ($C_2H_4$), propane ($C_3H_8$), propylene ($C_3H_6$), carbon monoxide (CO), and nitrogen monoxide (NO), by making said mixed gas components permeate through a DDR type zeolite membrane being formed as a membrane on a substrate and including a main component of silica, wherein each single gas permeance at room temperature and 100° C. are different, respectively, to separate said at least one type of gas component.

2. A DDR type zeolite membrane formed on a substrate, said membrane having a thickness of 0.1 to 50 μm and including a main component of silica, wherein each single gas permeance at room temperature and 100° C. are different, respectively, among at least two types of gases selected from the group consisting of carbon dioxide ($CO_2$), hydrogen ($H_2$), oxygen ($O_2$), nitrogen ($N_2$), methane ($CH_4$), normal butane (n-$C_4H_{10}$), isobutane (i-$C_4H_{10}$), sulfur hexafluoride ($SF_6$), ethane ($C_2H_6$), ethylene ($C_2H_4$), propane ($C_3H_8$), propylene ($C_3H_6$), carbon monoxide (CO), and nitrogen monoxide (NO).

3. The DDR type zeolite membrane according to claim 1, wherein a gas permeance of carbon dioxide ($CO_2$) at room temperature is $1.0 \times 10^{-9}$ (mol·m$^{-2}$·s$^{-1}$·Pa$^{-1}$) or more.

4. The DDR type zeolite membrane according to claim 1, wherein a gas permeance of carbon dioxide ($CO_2$) at 100° C. is $5.0 \times 10^{-10}$ (mol·m$^{-2}$·s$^{-1}$·Pa$^{-1}$) or more.

5. The DDR type zeolite membrane according to claim 1, wherein a separation factor of $CO_2/CH_4$ in a mixed gas containing carbon dioxide ($CO_2$) and methane ($CH_4$) in an equimolar amount is 2 or more at room temperature and 100° C.

6. The DDR type zeolite membrane according to claim 1, wherein each value of a ratio of a single gas permeance of carbon dioxide ($CO_2$) at room temperature and 100° C. to a single gas permeance of any one of hydrogen ($H_2$), oxygen ($O_2$), nitrogen ($N_2$), methane ($CH_4$), normal butane (n-$C_4H_{10}$), isobutane (i-$C_4H_{10}$), and sulfur hexafluoride ($SF_6$) at room temperature and 100° C. is 2 or more.

7. The DDR type zeolite membrane according to claim 6, wherein a value of a ratio of a single gas permeance of hydrogen ($H_2$) at room temperature and 100° C. to a single gas permeance of any one of oxygen ($O_2$), nitrogen ($N_2$), methane ($CH_4$), normal butane (n-$C_4H_{10}$), isobutane (i-$C_4H_{10}$), and sulfur hexafluoride ($SF_6$) at room temperature and 100° C. is 2 or more.

8. The DDR type zeolite membrane according to claim 6, wherein each value of a ratio of a single gas permeance of oxygen ($O_2$) at room temperature and 100° C. to a single gas permeance of any one of nitrogen ($N_2$), methane ($CH_4$), normal butane (n-$C_4H_{10}$), isobutane (i-$C_4H_{10}$), and sulfur hexafluoride ($SF_6$) at room temperature and 100° C. is 1.1 or more.

9. The DDR type zeolite membrane according to claim 6, wherein each value of a ratio of a single gas permeance of nitrogen ($N_2$) at room temperature and 100° C. to a single gas permeance of any one of methane ($CH_4$), normal butane (n-$C_4H_{10}$), isobutane (i-$C_4H_{10}$), and sulfur hexafluoride ($SF_6$) at room temperature and 100° C. is 2 or more.

10. The DDR type zeolite membrane according to claim 6, wherein each value of a ratio of a single gas permeance of methane ($CH_4$) at room temperature and 100° C. to a single gas permeance of any one of normal butane (n-$C_4H_{10}$), isobutane (i-$C_4H_{10}$), and sulfur hexafluoride ($SF_6$) at room temperature and 100° C. is 2 or more.

11. The DDR type zeolite membrane according to claim 6, wherein each value of a ratio of a single gas permeance of normal butane (n-$C_4H_{10}$) at room temperature and 100° C. to a single gas permeance of isobutane (i-$C_4H_{10}$) or sulfur hexafluoride ($SF_6$) at room temperature and 100° C. is 1.1 or more.

12. The DDR type zeolite membrane according to claim 6, wherein each value of a ratio of a single gas permeance of isobutane (i-$C_4H_{10}$) at room temperature and 100° C. to a single gas permeance of sulfur hexafluoride ($SF_6$) at room temperature and 100° C. is 1.1 or more.

13. The DDR type zeolite membrane according to claim 1, wherein each separation factor of $H_2/CH_4$ in a mixed gas containing hydrogen ($H_2$) and methane ($CH_4$) in an equimolar amount at room temperature and 100° C. is 2 or more.

14. The DDR type zeolite membrane according to claim 1, wherein each separation factor of $C_2H_4/C_2H_6$ in a mixed gas containing ethylene ($C_2H_4$) and ethane ($C_2H_6$) in an equimolar amount at room temperature and 100° C. is 1.5 or more.

15. The DDR type zeolite membrane according to claim 1, wherein each separation factor of $O_2/N_2$ in the air at room temperature and 100° C. is 1.5 or more.

16. A DDR type zeolite membrane composite, comprising a porous substrate and a DDR type zeolite layer deposited within pores of the porous substrate and having a thickness 5 to 50 times of a mean pore diameter of the porous substrate, said DDR zeolite layer being composed of a DDR type zeolite having been disposed within pores of at least one surface of the porous substrate.

17. The DDR type zeolite membrane composite according to claim 16, further comprising another DDR type zeolite layer deposited outside of the porous substrate, said another DDR type zeolite layer having a thickness of 30 μm or less and being formed on a surface of said porous substrate on which said DDR type zeolite layer deposited within said pores of said porous substrate is disposed.

18. The DDR type zeolite membrane composite according to claim 16, wherein said mean pore diameter of said porous substrate is 0.05 to 10 μm.

19. A gas separation apparatus comprising a DDR type zeolite membrane being formed as a membrane on a substrate and having silica as a main component, wherein said DDR type zeolite membrane separates at least one type of gas component from a mixed gas containing at least two types of gas components selected from the group consisting of carbon dioxide ($CO_2$), hydrogen ($H_2$), oxygen ($O_2$), nitrogen ($N_2$), methane ($CH_4$), normal butane (n-$C_4H_{10}$), isobutane (i-$C_4H_{10}$), sulfur hexafluoride ($SF_6$), ethane ($C_2H_6$), ethylene ($C_2H_4$), propane ($C_3H_8$), propylene ($C_3H_6$), carbon monoxide (CO), and nitrogen monoxide (NO), and wherein each single gas permeance at room temperature and 100° C. are different, respectively, in order to separate said at least one type of gas component from said mixed gas.

20. The gas separation apparatus according to claim 19, wherein the gas separation apparatus selectively separates carbon dioxide ($CO_2$) from a mixed gas containing carbon dioxide and methane ($CH_4$).

* * * * *